(12) United States Patent
Amako et al.

(10) Patent No.: US 7,944,544 B2
(45) Date of Patent: May 17, 2011

(54) LIQUID CRYSTAL DEVICE HAVING A DIFFRACTION FUNCTION LAYER THAT INCLUDES A FLAT PORTION AND A NON-FLAT PORTION WITH A GRID DISPOSED IN THE NON-FLAT PORTION

(75) Inventors: Jun Amako, Matsumoto (JP); Daisuke Sawaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 126 days.

(21) Appl. No.: 12/129,987

(22) Filed: May 30, 2008

(65) Prior Publication Data

US 2008/0304004 A1 Dec. 11, 2008

(30) Foreign Application Priority Data

Jun. 7, 2007 (JP) ................... 2007-151222
Apr. 28, 2008 (JP) ................... 2008-116765

(51) Int. Cl.
*G02F 1/13* (2006.01)
*G02B 27/44* (2006.01)
(52) U.S. Cl. ........................ 349/201; 359/563
(58) Field of Classification Search ............ 349/201, 349/202; 359/486, 558–576
See application file for complete search history.

(56) References Cited

U.S. PATENT DOCUMENTS

| | | | | |
|---|---|---|---|---|
| 5,148,302 | A * | 9/1992 | Nagano et al. ............... | 349/201 |
| 7,114,820 | B1 * | 10/2006 | Parikka et al. ............... | 362/602 |
| 2005/0141090 | A1 * | 6/2005 | Huang et al. ............... | 359/486 |
| 2007/0242187 | A1 * | 10/2007 | Yamaki et al. ............... | 349/96 |

FOREIGN PATENT DOCUMENTS

| | | |
|---|---|---|
| JP | A 2002-520677 | 7/2002 |
| JP | A 2006-133275 | 5/2006 |
| WO | WO 00/04418 A1 | 1/2000 |

* cited by examiner

*Primary Examiner* — Mark A Robinson
*Assistant Examiner* — Paul C Lee
(74) *Attorney, Agent, or Firm* — Oliff & Berridge, PLC

(57) ABSTRACT

An optical element includes a diffraction function layer for diffracting at least a part of incident light and a grid disposed on a first surface of the diffraction function layer and including a plurality of wires. The first surface includes a plurality of first areas and a plurality of second areas. The first areas and the second areas are different from each other in a height from a second surface of the diffraction function layer as a surface opposite to the first surface. Steps are provided on boundaries between the first areas and the second areas.

19 Claims, 20 Drawing Sheets

LIQUID CRYSTAL DEVICE HAVING A DIFFRACTION FUNCTION LAYER THAT INCLUDES A FLAT PORTION AND A NON-FLAT PORTION WITH A GRID DISPOSED IN THE NON-FLAT PORTION

The entire disclosure of Japanese Patent Application Nos: 2007-151222, filed Jun. 7, 2007 and 2008-116765, filed Apr. 28, 2008 are expressly incorporated by reference herein.

BACKGROUND

1. Technical Field

Several aspects of the present invention relate to an optical element, a liquid crystal device, an electronic apparatus, an optical element manufacturing method, and a liquid crystal device manufacturing method.

2. Related Art

A wire grid polarization element is known as one of optical elements having a polarization-separation function. This element is an element having a number of conductive wires arranged at a pitch smaller than the wavelength of light. Also, this element has the property of reflecting components having a polarization axis parallel to the wires among components of incident light and transmitting components having a polarization axis perpendicular to the wires thereamong.

On the other hand, an aluminum scattering plate having bumps and dips with a height of, e.g., approximately 1 μm on a surface thereof is known as a means for reflecting and diffusing incident light. If a wire grid polarization element is formed on the surface of an aluminum scattering plate, the aluminum scattering plate obtains a polarization-separation function as well as a reflection light-scattering function (see JP-T-2002-520677).

However, it is difficult to form such an optical element for the following reasons. That is, as shown in FIG. 21, if a resist 34 is applied onto a surface of an aluminum scattering plate 97 formed on a base 96 so as to form a wire grid polarization element by photolithography, the resist 34 comes to have uneven thicknesses due to bumps and dips on the surface of the aluminum scattering plate 97. This is a problem in that a part of the resist 34 is insufficiently exposed or developed and thus wires are formed only on a part of the aluminum scattering plate 97. Also, if laser interference exposure is performed, slopes shown by an area B in FIG. 21 fail to be illuminated with the interference beams. This is a problem in that the area B is inadequately exposed and thus no wires are formed in the area B.

SUMMARY

An advantage of the invention is to provide an optical element, a liquid crystal device, and an electronic apparatus that each has a polarization-separation function as well as a light-scattering function, and a method for manufacturing such an optical element and a method for manufacturing method such a liquid crystal device.

According to a first aspect of the invention, an optical element includes a diffraction function layer for diffracting at least a part of incident light and a grid disposed on a first surface of the diffraction function layer and including a plurality of wires. The first surface includes a plurality of first areas and a plurality of second areas. The first areas and the second areas are different from each other in a height from a second surface of the diffraction function layer as a surface opposite to the first surface. Steps are provided on boundaries between the first areas and the second areas.

According to such a configuration, multiple bumps and dips formed by the first areas and second areas are distributed on the first surface of the diffraction function layer. The diffraction function layer diffracts incident light using the distributed bumps and dips so that the incident light is scattered in directions different from the incident direction. Among components of the incident light, components having a polarization axis parallel with the wires are reflected by the grid and those having a polarization axis perpendicular to the wires are transmitted by the grid. As is understood from the above-description, the optical element separates the incident light into reflected light and transmitted light that is in different polarization states, as well as expands the projection direction of the incident light.

In the optical element according to the first aspect of the invention, the first areas are preferably in parallel with the second areas vertically.

According to such a configuration, light is allowed to enter the first areas and second areas at equal angles simultaneously. As a result, the grid is easily formed on the diffraction function layer by laser interference exposure. Photolithography techniques other than laser interference exposure may be used.

In the optical element according to the first aspect of the invention, the first areas are preferably disposed on the first surface irregularly.

According to such a configuration, the bumps and dips formed by the first areas and second areas are irregularly distributed on the first surface of the diffraction function layer under no rule in a statistically even manner. Therefore, the incident light is scattered in various directions. As a result, the range over which the incident light is scattered by the optical element is expanded.

In the optical element according to the first aspect of the invention, the first surface preferably includes a plurality of unit patterns, in each of which the first areas and second areas are disposed so that these areas are irregularly distributed.

According to such a configuration, a photomask in which a mask pattern corresponding to the above-described unit pattern is repeatedly disposed is used when manufacturing the diffraction function layer. Such a photomask is easy to manufacture. As a result, the optical element is easily manufactured.

In the optical element according to the first aspect of the invention, directions of adjacent unit patterns among the unit patterns are preferably different from each other.

According to such a configuration, the incident light is prevented from being unevenly diffused in specific directions due to the cycle in which the unit pattern is repeatedly disposed.

In the optical element according to the first aspect of the invention, peripheries of the first areas and second areas preferably each include a straight line. The wires are preferably disposed at a given angle with respect to the straight line.

According to such a configuration, the steps provided on the boundaries between the first areas and second areas are nonparallel to the wires. As a result, the wires disposed in the proximity of the steps are prevented from becoming unstable.

In the optical element according to the first aspect of the invention, if a wavelength of incident light is represented by $\lambda$, an incident angle is represented by $\theta$, and a refraction index of a surrounding medium of the optical element is represented by n, a height of the steps is preferably approximately equal to $\lambda/(4n \cdot \cos\theta)$.

According to such a configuration, the incident light having the wavelength $\lambda$ is widely diffused.

In the optical element according to the first aspect of the invention, the diffraction function layer is preferably made of a material different from a material of the grid and is translucent.

According to such a configuration, among components of the incident light, components transmitted by the grid are taken out of the optical element. That is, a semi-transmission/semi-reflection optical element is obtained.

The optical element according to the first aspect of the invention preferably further includes an adhesion layer disposed between the diffraction function layer and the grid and made of a material different from the respective materials of the diffraction function layer and the grid. An adhesion strength between the diffraction function layer and the adhesion layer and an adhesion strength between the grid and the adhesion layer are preferably each higher than an adhesion strength between the diffraction function layer and the grid.

According to such a configuration, the adhesiveness between the diffraction function layer and grid is improved by disposing the adhesion layer therebetween.

According to a second aspect of the invention, a liquid crystal device includes: first and second substrates disposed so as to face each other; liquid crystal disposed between the first and second substrates; and a plurality of pixels each including the optical element disposed in at least a part of each of the pixels between the first substrate and the liquid crystal. The optical element includes: a diffraction function layer for diffracting at least a part of incident light; and a grid that is disposed on a first surface of the diffraction function layer, includes a plurality of wires, and has a polarization-separation function. The first surface includes a plurality of first areas and a plurality of second areas different from the first areas in a height from a second surface of the diffraction function layer as a surface opposite to the first surface. Steps are provided on boundaries between the first areas and the second areas.

According to such a configuration, among areas of each pixel, an area where the optical element is formed is made into a reflection display part and the remaining area is made into a transmission display part. Thus, light incident to the reflection display part from the second substrate is reflected and diffused by the optical element. As is understood from the above-description, the optical element having both a polarization-separation function and a light light-scattering function is disposed on the inner surface of the first substrate; therefore, the liquid crystal device is slimmed down. Also, the shape of a surface of the optical element facing the liquid crystal is approximately a plane; therefore, the optical element less affects the alignment of the liquid crystal, thereby improving the display quality.

The liquid crystal device according to the second aspect of the invention further includes a lighting system that is disposed on a side of the first substrate opposite to the second substrate and intended to apply light onto the first substrate.

According to such a configuration, light from the lighting system is taken out of the transmission display part of each pixel and thus transmission display is made. In this case, light incident to the reflection display part from the lighting system is reflected and diffused by the optical element and then enters the lighting system again. A part of such light is reflected by the lighting system and then enters the transmission display part. Thus, the light use efficiency of the transmission display is improved.

In an electronic apparatus according to a third aspect of the invention, a display includes the above-described liquid crystal device.

According to such a configuration, the electronic apparatus is downsized. Also, the electronic apparatus makes high-quality displays on a display unit thereof.

According to a fourth aspect of the invention, an optical element includes: a diffraction function layer for diffracting at least a part of incident light; and a grid disposed on a first surface of the diffraction function layer and including a plurality of wires. The first surface includes a plurality of areas different from each other in a height from a second surface of the diffraction function layer as a surface opposite to the first surface. Steps are provided on boundaries between the plurality of areas.

In the optical element according to the fourth aspect of the invention, if a wavelength of incident light is represented by $\lambda$, an incident angle is represented by $\theta$, and a refraction index of a surrounding medium of the optical element is represented by n, a height of the steps is preferably approximately equal to $(2m+1)\lambda/(4n \cdot \cos \theta)$ where $m = 0, 1, 2, 3 \ldots$ .

According to such a configuration, the steps having different heights are disposed in such a manner that the steps are distributed according to applications. Thus, the range of uses of the optical element is expanded.

According to a fifth aspect of the invention, a liquid crystal device includes: first and second substrates disposed so as to face each other; liquid crystal disposed between the first and second substrates; and a plurality of pixels each including the above-described optical element having multiple areas with different heights. The optical element is disposed in at least a part of each of the pixels between the first substrate and the liquid crystal. The plurality of areas include an area whose display color is red, an area whose display color is green, and an area whose display color is blue, and the red area, green area, and blue area have the different heights.

According to such a configuration, a liquid crystal device is obtained that allows light to be reflected and diffused according to the respective wavelengths of three primary colors.

According to a sixth aspect of the invention, a method for manufacturing an optical element includes (a) forming a diffraction function layer, (b) forming a conductive film, and (c) forming a grid. In step (a), by processing a part of a first surface of a diffraction function material layer, a plurality of first areas and a plurality of second areas different from the first areas in a height from a second surface of the diffraction function material layer are formed on the first surface and steps are formed on boundaries between the first areas and second areas. In step (b), a conductive film is formed on the diffraction function film. In step (c), by processing a part of the conductive film, a grid including a plurality of wires and having a polarization-separation function is formed.

According to such a manufacturing method, an optical element is manufactured that separates the incident light into reflected light and transmitted light that is in different polarization states as well as expands the projection direction. Etching, exposure/development, patterning, and the like may be used as the processing method.

In the method for manufacturing an optical element according to the sixth aspect of the invention, step (c) includes (d) laminating an antireflection film and a resist sequentially on the conductive film, (e) subjecting the resist to laser interference exposure and then developing the resist, (f) processing the conductive film using the developed resist as a mask, and (g) eliminating the resist and the antireflection film.

According to such a manufacturing method, when laser interference exposure is performed, the antireflection film prevents the laser from being reflected off the surface of the conductive film. As a result, the grid is formed with high shape and size accuracies.

According to a seventh aspect of the invention, a method for manufacturing a liquid crystal device having a plurality of pixels includes (h) forming a diffraction function material layer on a first substrate, (i) forming an optical element in at least a part of each of the pixels, and (j) bonding a second substrate to the first substrate in such a manner that the second substrate is opposed to a surface of the first substrate on which the optical element is formed. In step (i): by processing a part of a first surface of the diffraction function material layer, a diffraction function layer, on a first surface thereof, having a plurality of first areas and a plurality of second areas different from the first areas in a height from a second surface as well as having steps on boundaries between the first areas and second areas is formed; a conductive film is formed on the diffraction function film; and by processing a part of the conductive film, a grid including a plurality of wires and having a polarization-separation function is formed.

According to such a manufacturing method, a liquid crystal device is manufactured that has an optical element disposed on the inner surface of the first substrate and having a light reflection function, a polarization-separation function, and a light light-scattering function.

In the method for manufacturing a liquid crystal device according to the seventh aspect of the invention, the pixels preferably each include a reflection display part and a transmission display part. Step (i) preferably includes (k) eliminating the conductive film formed in the transmission display part of each of the pixels.

According to such a configuration, both the reflection display part including the above-described optical element and the transmission display part not including the optical element are provided in one pixel.

BRIEF DESCRIPTION OF THE DRAWINGS

The invention will be described with reference to the accompanying drawings, wherein like numbers reference like elements.

FIG. 10A is a perspective view of the liquid crystal device, and FIG. 10B is a sectional view of the liquid crystal device taken along line A-A of FIG. 10A.

DESCRIPTION OF EXEMPLARY EMBODIMENTS

An optical element according to an embodiment of the invention will now be described with reference to the accompanying drawings. Note that in order to make the components recognizable in these drawings, the components are shown in such a manner that the sizes thereof or ratios in size thereamong are different from actual ones as appropriate.

A. Optical Element

Figure 1A:
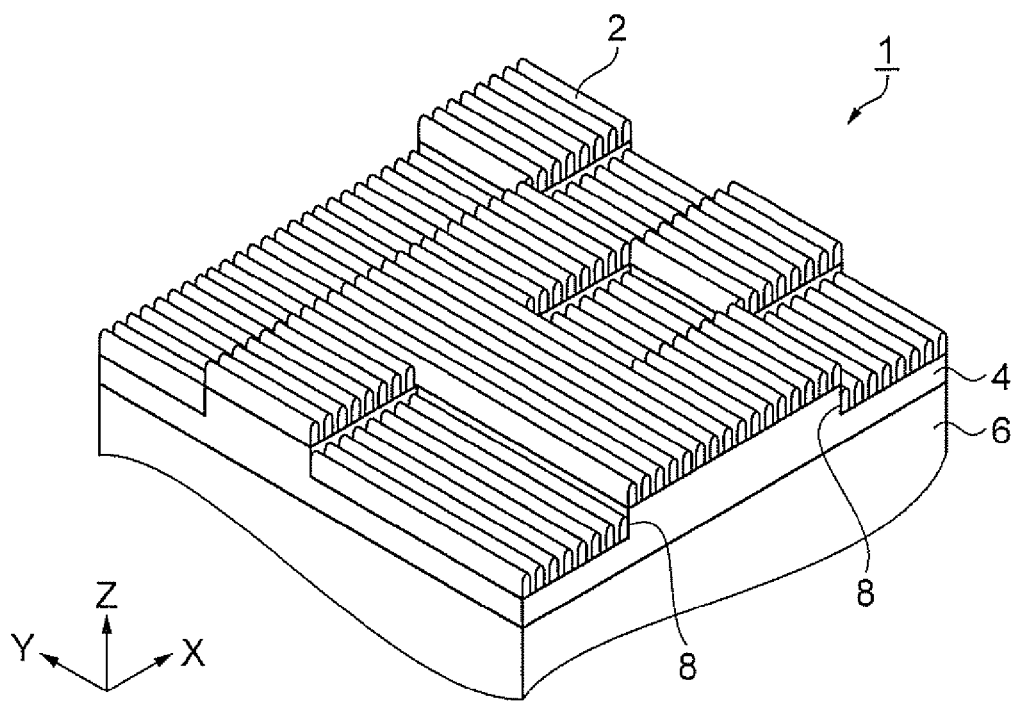
FIG. 1A is a perspective view of an optical element according to an embodiment of the invention.
Figure 2A:
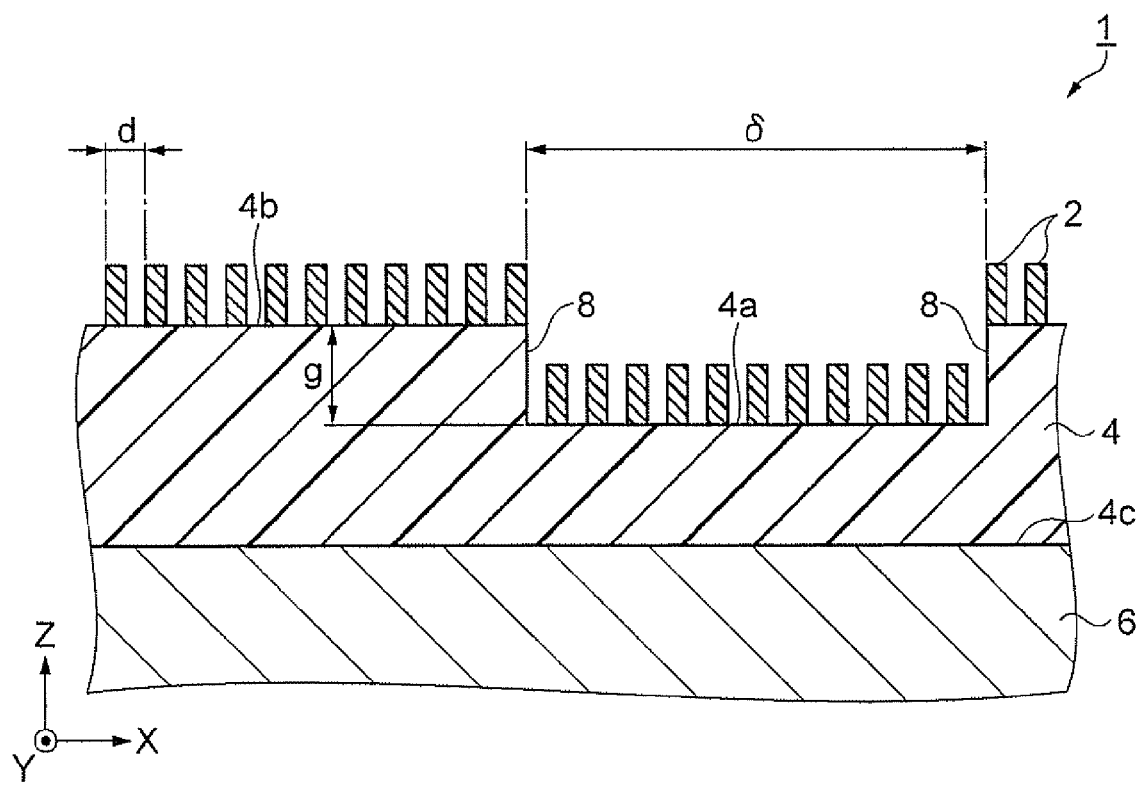
FIG. 2A is a sectional view of the optical element taken along plane X-Z of FIG. 1A.

FIG. 1A is a perspective view of an optical element 1 according to this embodiment, FIG. 2A is a sectional view of the optical element 1 taken along plane X-Z of FIG. 1A. The optical element 1 includes a base 6 made of glass or the like, a diffraction function layer 4 disposed on the base 6, and a grid 2 disposed on the diffraction function layer 4. FIG. 1A is a partially enlarged view of the optical element 1 and, actually, structures similar to what is shown in FIG. 1A are continuously disposed over a wider range along plane X-Y.

Figure 1B:
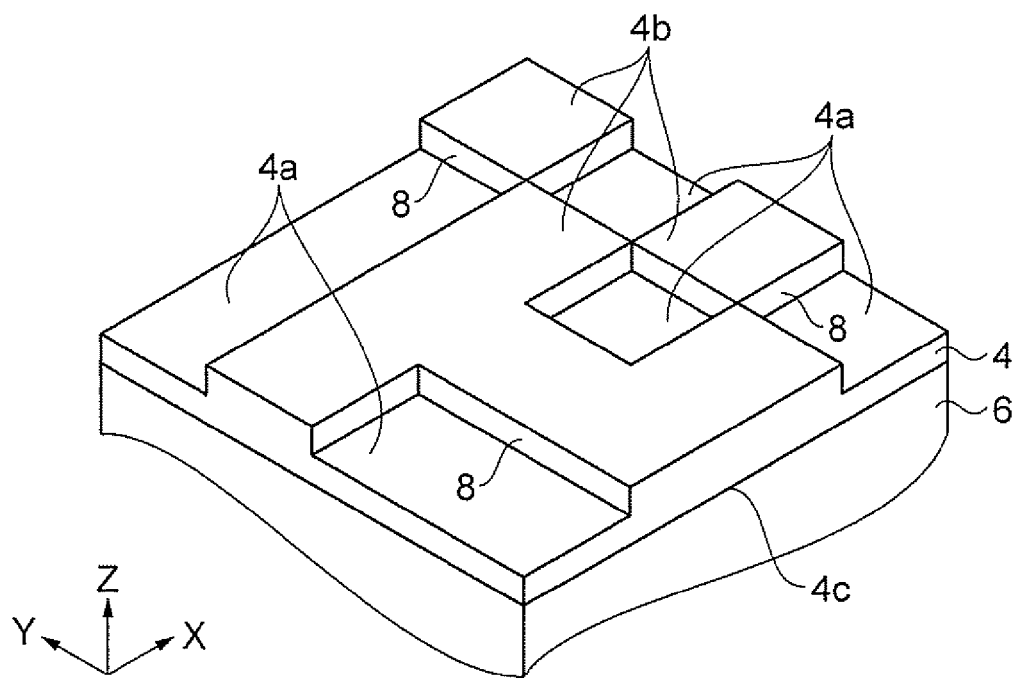
FIG. 1B is a perspective view showing the shape of a diffraction function layer.

FIG. 1B is a perspective view showing the shape of the diffraction function layer 4 while not showing the grid 2 in FIG. 1A. The diffraction function layer 4 includes polymers having transparency with respect to incident light and has a number of bumps and dips on a first surface thereof. The first surface includes multiple first areas 4a and multiple second areas 4b. The second areas 4b are different from the first areas 4a in the height from a second surface 4c of the diffraction function layer 4 (that is, a surface of the diffraction function layer 4 in contact with the base 6). In this embodiment, the second areas 4b are higher than the first areas 4a. Steps 8 are provided on the boundaries between the first areas 4a and second areas 4b. The height g (FIG. 2A) of the steps 8 is set to be smaller than the wavelength of incident light and, for example, may be set to 152 nm. Also, the steps 8 are approximately perpendicular to the first areas 4a and second areas 4b. That is, a section of the diffraction function layer 4 is approximately rectangular.

The first areas 4a and second areas 4b are disposed randomly. These areas are each a square or an irregular combination of the squares in the vertical or lateral direction. Here, the smallest size (that is, the length of one side of the above-described square) 6 (FIG. 2A) of the first areas 4a and second areas 4b is larger than the wavelength of incident light. If visible light is used, the δ may be set to, e.g., 2 μm. The first areas 4a and second areas 4b are planes that are in parallel with each other.

In practice, the grid 2 is formed on the first surface (that is, on the first areas 4a and second areas 4b) of the diffraction function layer 4, as shown in FIG. 1A. The grid 2 includes a number of aluminum wires that are in parallel with each other. The wires are disposed in parallel with one of straight lines included in the peripheries of the first areas 4a and second areas 4b. A disposition pitch d (FIG. 2A) of the microwaves is smaller than the wavelength λ of incident light and may be set to, e.g., 140 nm. Note that only a plural of actual wires are shown in FIG. 1A for the sake of convenience.

Figure 2B:
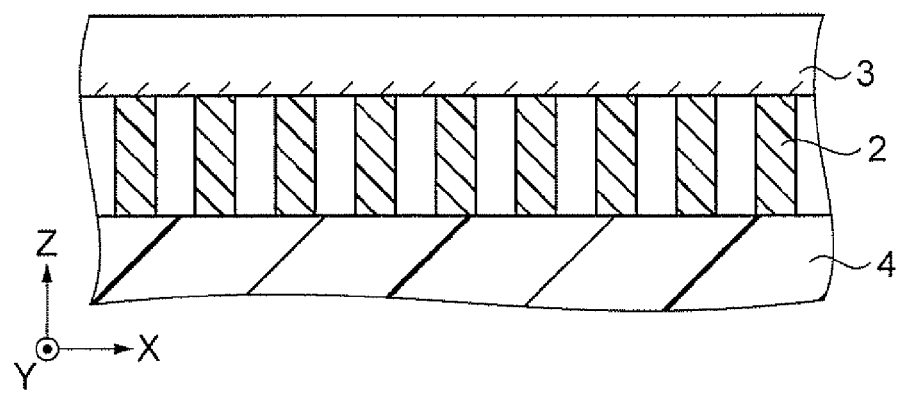
FIG. 2B is a partially enlarged sectional view of FIG. 2A.

FIG. 2B is a partially enlarged sectional view of FIG. 2A. As shown in this drawing, the grid 2 is sealed by a sealing layer 3 made of $SiO_2$, SiN, or the like. The space enclosed by the diffraction function layer 4, grid 2, and sealing layer 3 is under vacuum.

An adhesion layer made of a material different from those of the diffraction function layer 4 and grid 2 may be formed therebetween. In this case, the adhesion strength between the diffraction function layer 4 and adhesion layer and that between the grid 2 and adhesion layer is preferably higher than that between the diffraction function layer 4 and grid 2. Disposition of such an adhesion layer allows an improvement in the adhesiveness between the diffraction function layer 4 and grid 2. The material of the adhesion layer may be, for example, a dielectric thin film made of $SiO_2$ or the like.

Figure 3B:
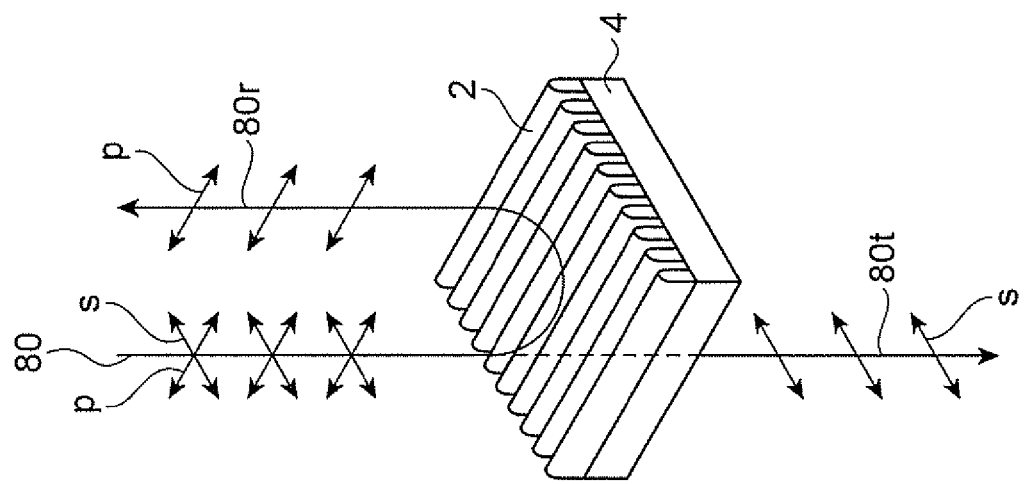
FIGS. 3A and 3B are schematic drawings showing functions of the optical element.
Figure 3A:
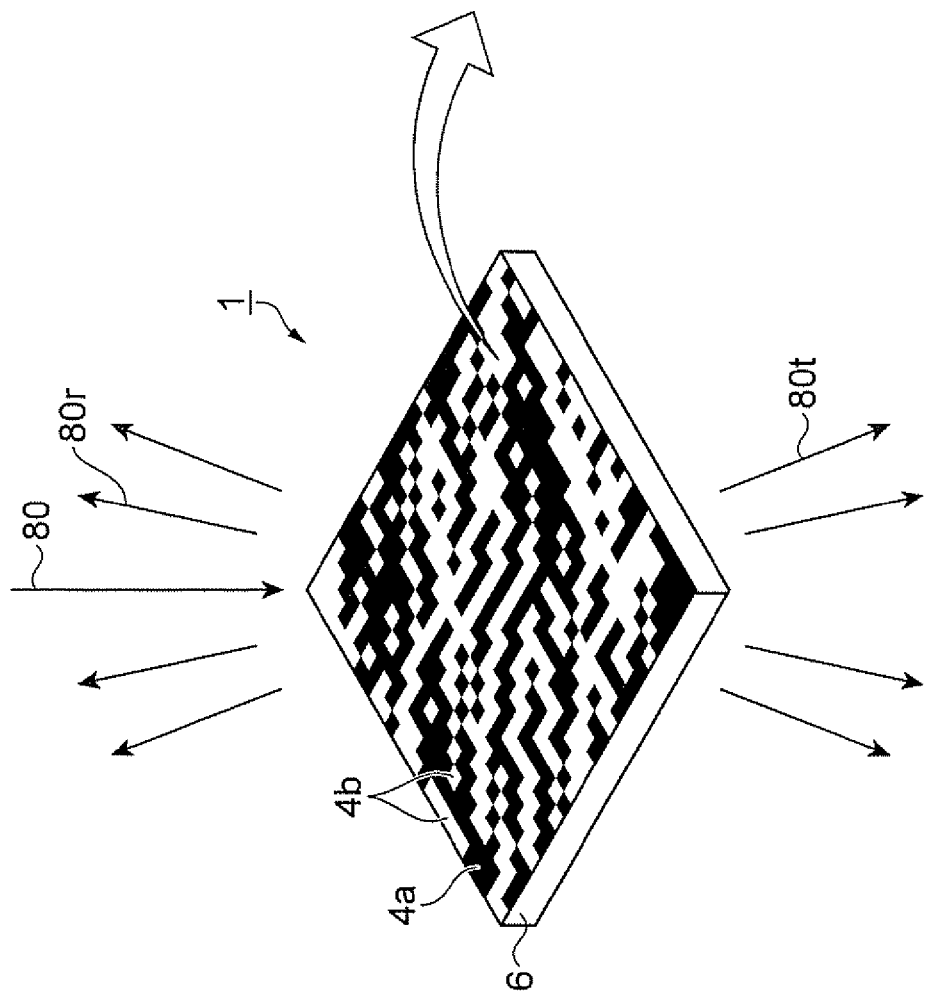

FIGS. 3A and 3B are schematic drawings showing functions of the optical element 1. Among these, FIG. 3A is a drawing showing a function of the diffraction function layer 4 and FIG. 3B is a drawing showing a function of the grid 2.

As shown in FIG. 3B, among components of incident light 80 to the grid 2, components p having a polarization axis parallel with the wires are reflected by the grid 2 and components s having a polarization axis perpendicular to the wires are transmitted by the grid 2. That is, the optical element 1 having the grid 2 has a polarization-separation function and separates the incident light 80 into reflected light 80r and transmitted light 80t that is in different polarization states.

In the optical element 1 shown in FIG. 3, black areas correspond to the first areas 4a and white areas correspond to the second areas 4b. Multiple bumps and dips formed by the first areas 4a and second areas 4c are distributed on the first surface of the diffraction function layer 4 (FIG. 1B). These bumps and dips distributed on the diffraction function layer 4 diffract the incident light 80 so that the incident light 80 is scattered in directions different from the incident direction as shown in FIG. 3A. More specifically, the diffraction function layer 4 acts so that both the reflected light 80r reflected by the grid 2 and the transmitted light 80t transmitted by the grid 2 is scattered.

Figure 4A:
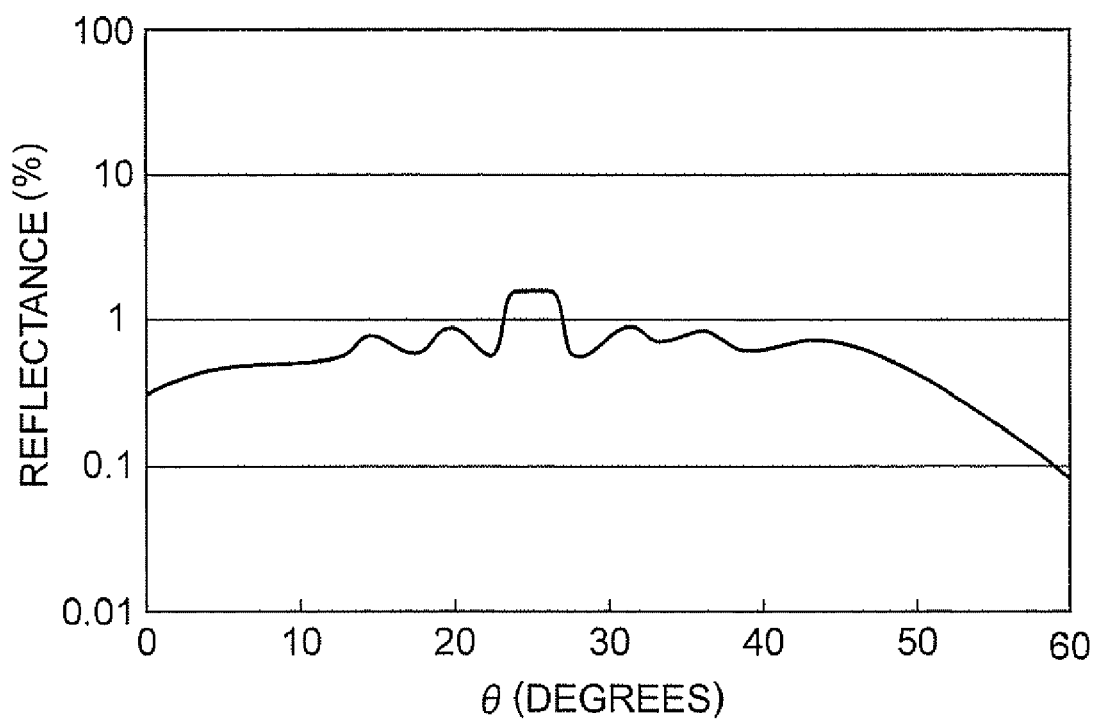
FIG. 4A is a graph showing reflection characteristics of the optical element.
Figure 4B:
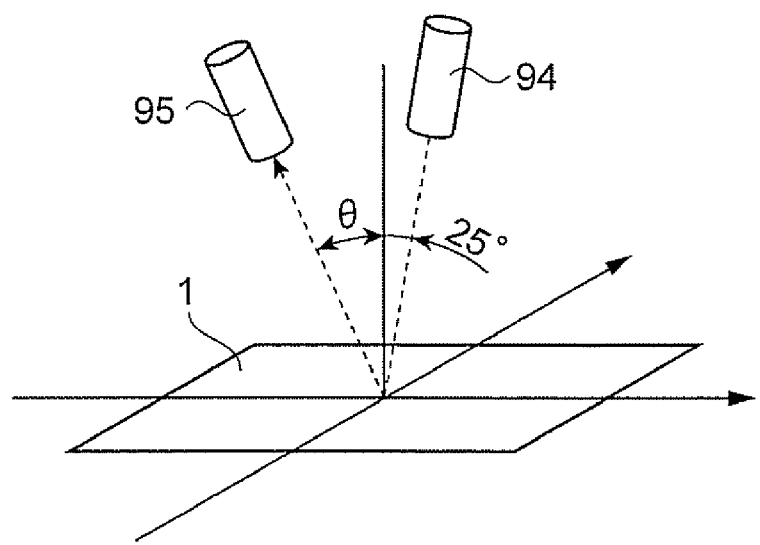
FIG. 4B is a drawing showing conditions for measuring the reflection characteristics.

FIG. 4A is a graph showing reflection characteristics of the optical element 1. The conditions for measuring these reflection characteristics are shown in FIG. 4B. Specifically, a projector 94 projects light at an angle of 25 degrees from a normal to the optical element 1. On the other hand, a photoreceptor 95 receives light while changing an angle that the photoreceptor 95 forms with the normal from 0 to 60 degrees. The relation between the angle θ and reflectance during that time is revealed in FIG. 4A. From FIG. 4A, it is understood that the incident light is scattered by the diffraction function layer 4 so that the reflected light is widely diffused even at angles other than an angle formed when incident light is reflected specularly. A width (range of a viewing field angle) φ of the reflected light depends on the smallest size δ of the first areas 4a and second areas 4b on the diffraction function layer 4. The relation between the φ and δ is represented by $\phi 2 = \lambda/\delta$. For example, if λ is 550 nm and δ is 2 μm, the φ is 32 degrees. If the optical element 1 is applied to a reflection display device, a viewing field sufficient for practical use is obtained. Also, by laying out the first areas 4a and second areas 4b intentionally or by shaping these areas intentionally, the reflection characteristics (width and shape of the viewing field) are controlled according to the applications of the optical element 1.

The height g of the steps 8 is preferably defined by $g = \lambda/(4n \cdot \cos\theta)$. Here, n represents the refraction index of a surrounding medium of the optical element 1 and θ represents the incident angle of light. By setting the height of the steps 8 in this way, the diffusion ranges of the reflected light 80r and transmitted light 80t are increased. Also, according to this formula, the height g of the steps 8 of the diffraction function layer 4 is reduced by using a material having a high refraction index as a surrounding medium of the grid 2. As the height g of the steps 8 is made smaller, the manufacturing process (process including a photolithography step) of the grid 2 is made easier. As a result, the grid 2 is more easily manufactured. For example, a surrounding medium to be laminated on the grid 2 is preferably SiN (n≈1.5).

If the optical element 1 having the above-described configuration is applied to a specific display device, the first areas 4a and second areas 4b of the diffraction function layer 4 may be completely randomly disposed on the entire surface of the diffraction function layer 4. Or, instead, a specific unit pattern in which the multiple first areas 4a and multiple second areas 4b are disposed in such a manner that these areas are randomly distributed may be created and the unit pattern may be repeatedly disposed in a plurality on the surface. While the size of the unit pattern may be arbitrarily set, its shape may, for example, be square 400 μm in each side. According to such a configuration, a photomask in which a mask pattern corresponding to the above-described unit pattern is repeatedly disposed in a plurality may be when manufacturing the diffraction function layer 4. This allows the photomask to be easily manufactured. As a result, the optical element is easily manufactured.

Figure 5:
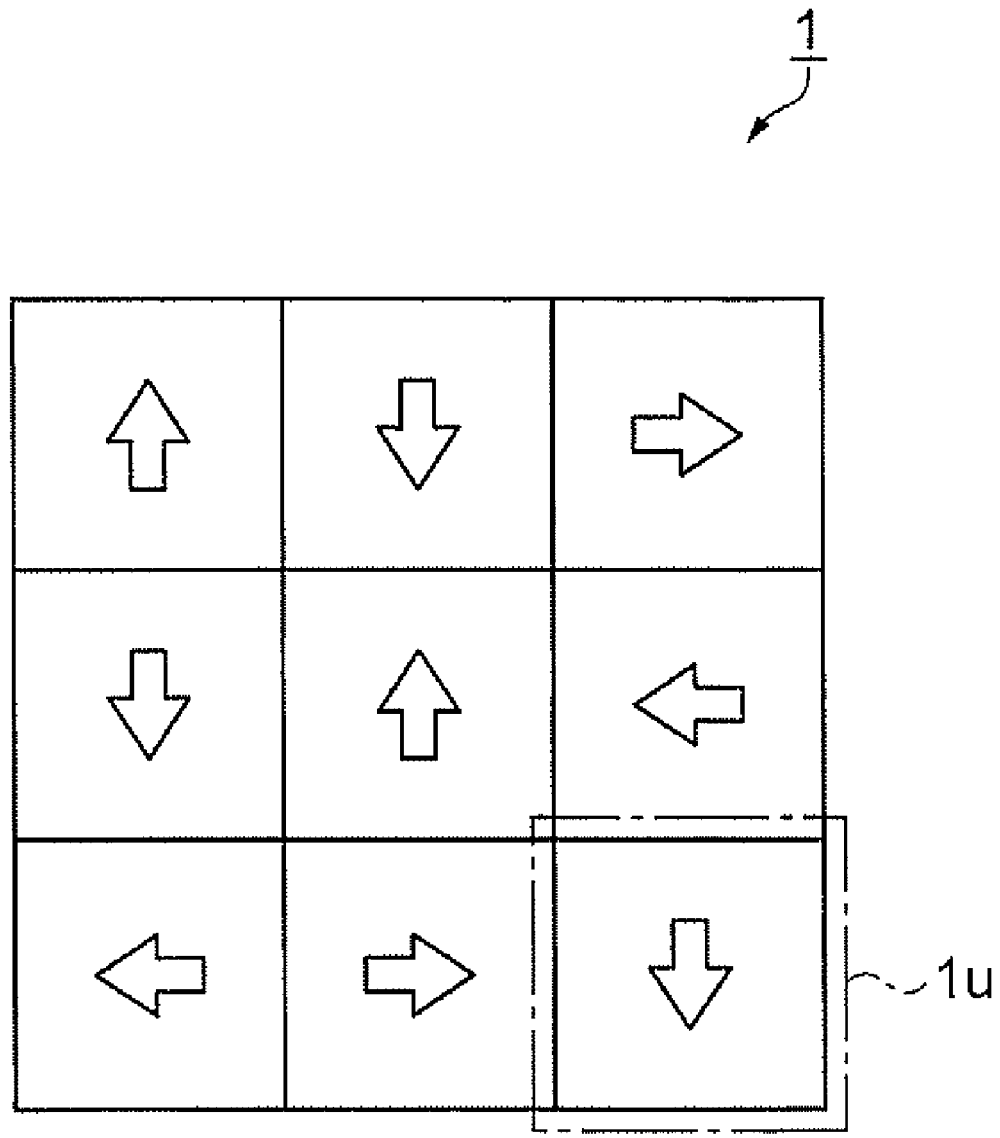
FIG. 5 is a diagram showing an example of disposition of unit patterns in the optical element.

Also, as shown in FIG. 5, adjacent unit patterns 1u may be disposed in such a manner that the directions thereof are different from each other. In FIG. 5, an arrow in each unit pattern 1u indicates the direction of the unit pattern 1u. Such disposition keeps the periodicity of the diffraction function layer 4 at a low level. As a result, the incident light is prevented from being unevenly diffused in specific directions due to the repetition cycle of the unit pattern 1u. Also, coloring due to the diffraction is reduced to the extent to which there occurs no problem for practical use.

As described above, the optical element 1 having the grid 2 and diffraction function layer 4 separates the incident light 80 into the reflected light 80r and transmitted light 80t that is in different polarization states using the grid 2 as well as diffuses the reflected light 80r and transmitted light 80t using the diffraction function layer 4. That is, according to this embodiment, the optical element having both a polarization-separation function and a light light-scattering function is obtained.

B. Optical Element Manufacturing Method

Figure 6:
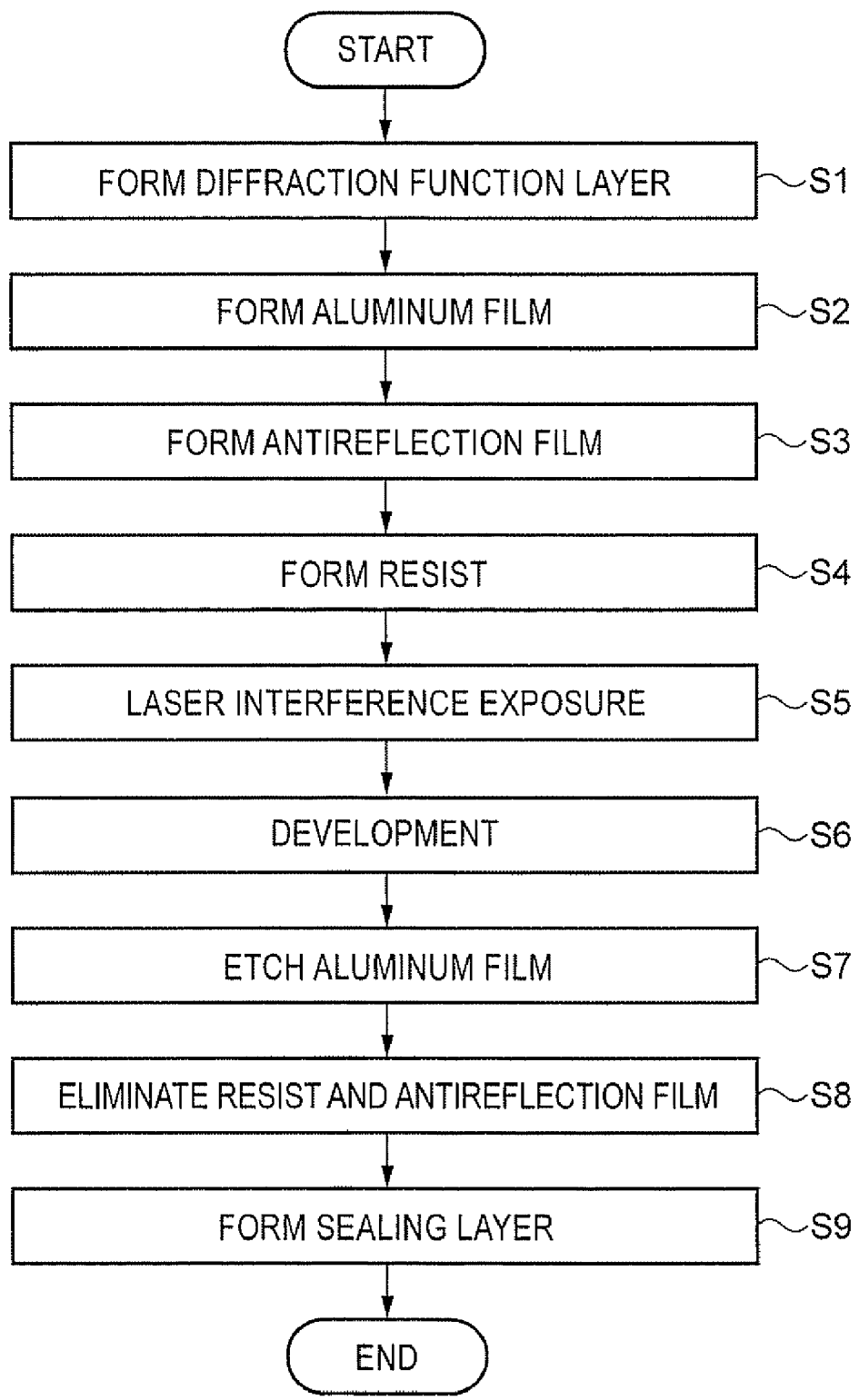
FIG. 6 is a flowchart of a method for manufacturing the optical element.

Referring now to FIGS. 6 to 8C, a method for manufacturing the optical element 1 will be described. FIG. 6 is a flowchart of the method for manufacturing the optical element 1. FIGS. 7A to 8C are sectional views in the manufacturing process of the optical element 1. Hereafter, the method for manufacturing the optical element 1 will be described along the flowchart of FIG. 6.

Figure 7A:
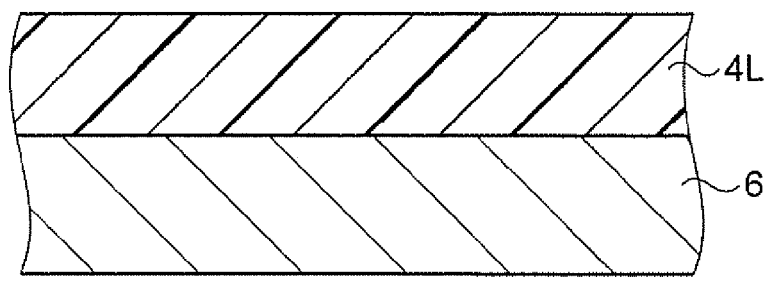
FIGS. 7A to 7C are sectional views in the manufacturing process of the optical element.
Figure 7B:
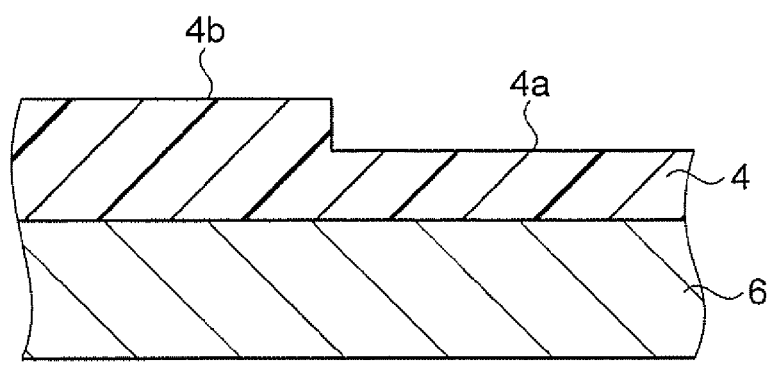

The diffraction function layer 4 is formed on the base 6 in step S1. In this step, first, a diffraction function material layer 4L made of polymers is coated on the base 6 made of glass with a thickness of 0.7 mm using spin coating or the like (FIG. 7A). Subsequently, areas corresponding to the first areas 4a on the diffraction function material layer 4L are selectively exposed using a photomask and then eliminated by wet developing. Thus, the first areas 4a and second areas 4b are formed on one surface of the diffraction function material layer 4L in such a manner that these areas are distributed thereon. In this embodiment, the difference in height between the first areas 4a and second areas 4b, that is, the depth of portions to be etched of the diffraction function material layer 4L is set to 152 nm. Also, etching is performed so that the first areas 4a and second areas 4b are in parallel with each other. Thus, the diffraction function layer 4 is formed on the base 6 (FIG. 7B).

Next, in step S2, an aluminum film 2L as a conductor film with a thickness of 120 nm is formed on the diffraction function layer 4 by sputtering or the like.

Figure 7C:
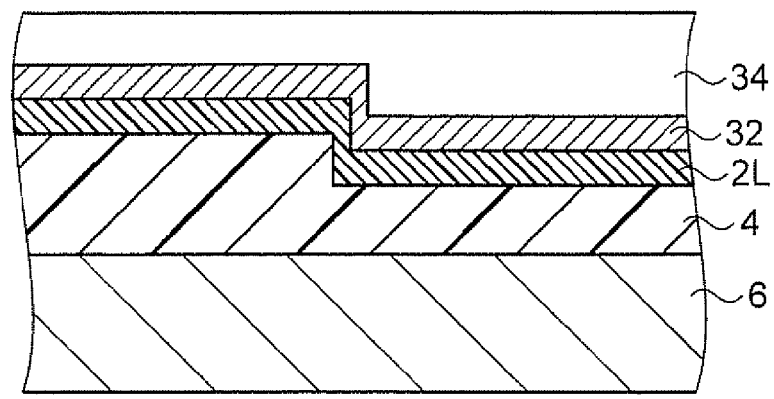
Figure 9A:
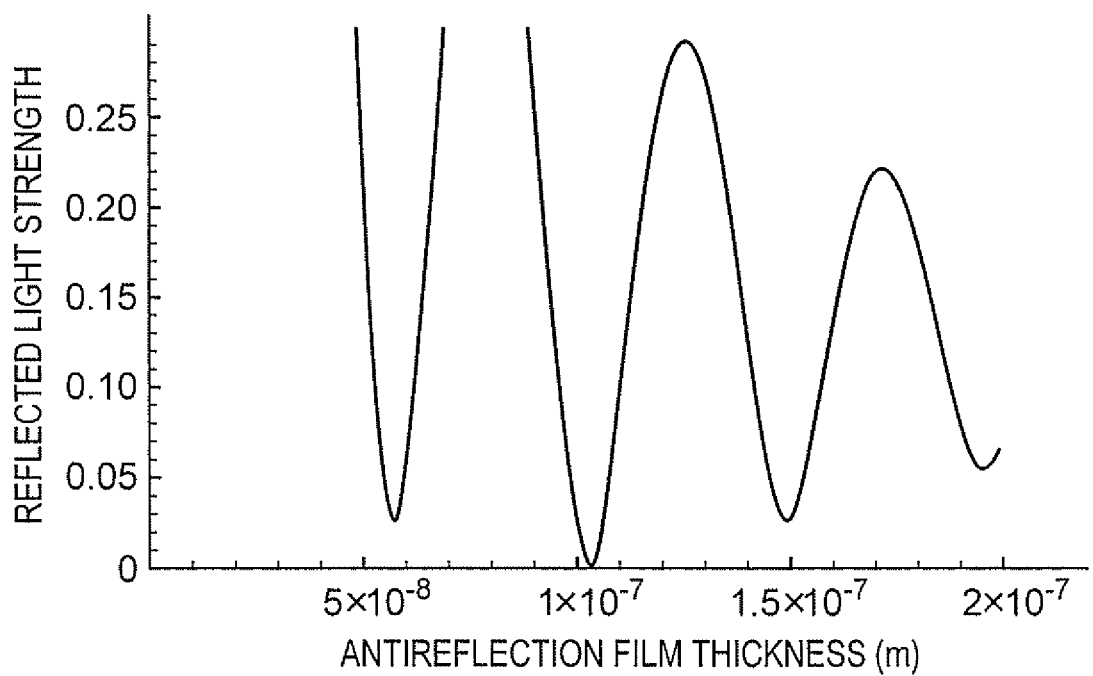
FIGS. 9A and 9B are graphs showing relations between the thickness of an antireflection film and the reflected light intensity on the interface between a resist and the antireflection film in a case where the resist is coated on the antireflection film.
Figure 9B:
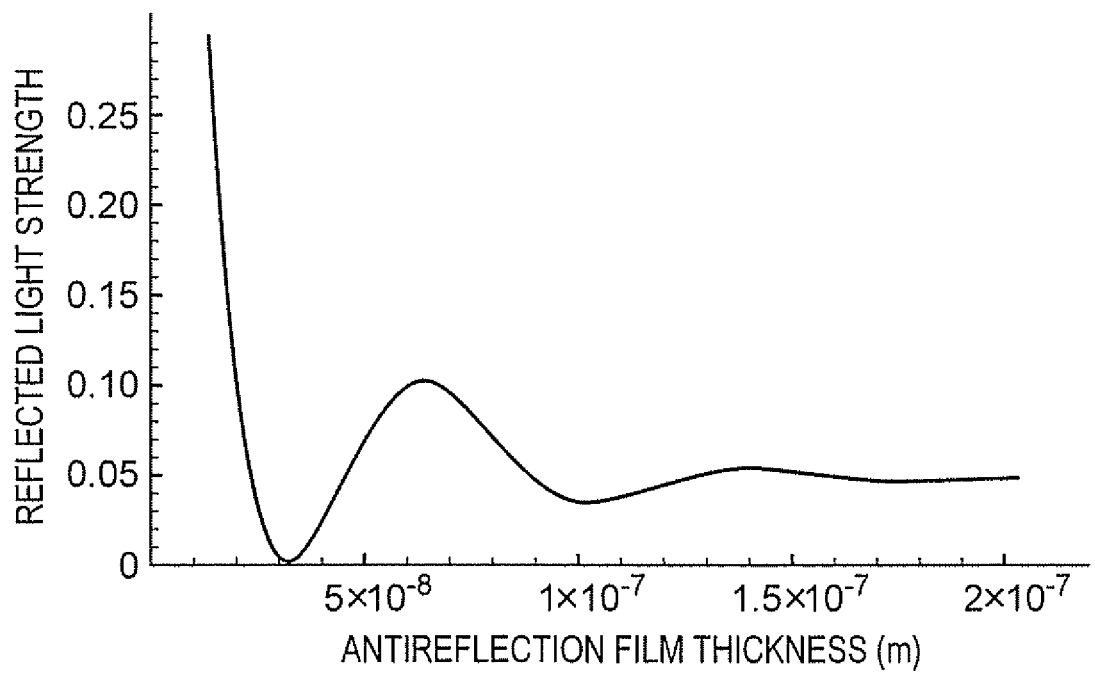

Next, in step S3, an antireflection film 32 is formed on the aluminum film 2L by vacuum deposition, sputtering, or the like. For example, SiC or $SiO_xN_y$:H (x, y are composition ratios) is suitable as the material of the antireflection film 32. Or, indium tin oxide (ITO) may be used. Whether the antireflection film 32 has an antireflection effect largely depends on the complex refractive index of the material. For example, the material preferably has a complex refractive index of 1.4 or more in its real part and has a complex refractive index of −0.1 or more and −1.5 or less in its imaginary part. FIGS. 9A and 9B are graphs showing the relations between the thickness of the antireflection 32 and the reflected light strength on the interface between the resist 34 and antireflection film 32 in a case where the resist 34 is coated on the antireflection 32 (FIG. 7C). FIG. 9A shows the relation in a case where SiC is used as the antireflection film 32 and FIG. 9B shows the relation in a case where $SiO_xN_y$:H is used as the antireflection film 32. Note that the optimum thickness of the antireflection film 32 varies depending on the film-forming conditions even if the same material is used.

Next, in step S4, the resist 34 having an approximately flat plane is formed on the antireflection film 32 by spin coating or the like (FIG. C).

Figure 8A:
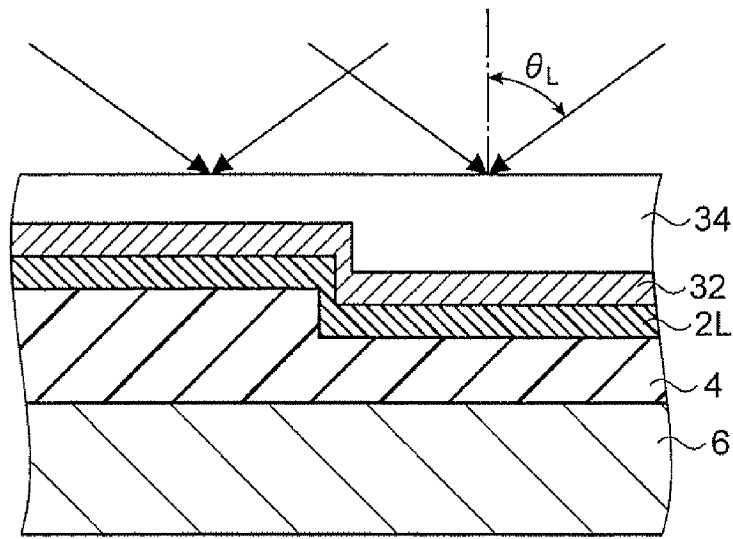
FIGS. 8A to 8C are sectional views in the manufacturing process of the optical element.

Next, in step S5, the resist 34 is subjected to laser interference exposure in such a manner that areas corresponding to positions where the wires of the grid 2 are formed, that is, minute linear areas having a pitch of 140 nm are selectively exposed. Thus, latent images of the wires are formed (FIG. 8A). As a light source for use in laser interference exposure, a continuous-wave deep ultra violet (DUV) laser with a wavelength of 266 nm may be used. An incident angle $\theta_L$ may be set to, for example, 72 degrees. In this case, since the antireflection film 32 is formed beneath the resist 34, the laser light is reflected by the aluminum film 2L so that inadequate exposure is prevented. Also, since the first areas 4a and second areas 4b of the diffraction function layer 4 are in parallel with each other, laser light enters these areas at equal angles simultaneously. Thus, laser light having approximately equal power densities is uniformly applied even onto the diffraction function layer 4 having bumps and dips. Thus, a pattern of the resist 34 and then the grid 2 are formed with high shape and size accuracies in later steps. While the resist 34 has slightly uneven thicknesses due to the bumps and dips on the diffraction function layer 4, there occurs almost no defect with respect to the pattern shape due to the uneven thicknesses, since the depth of the bumps and dips, that is, the height g of the steps 8 is as small as the order of 100 to 200 nm. Therefore, latent images similar to those in a case where a resist is formed on a flat surface are formed.

Figure 8B:
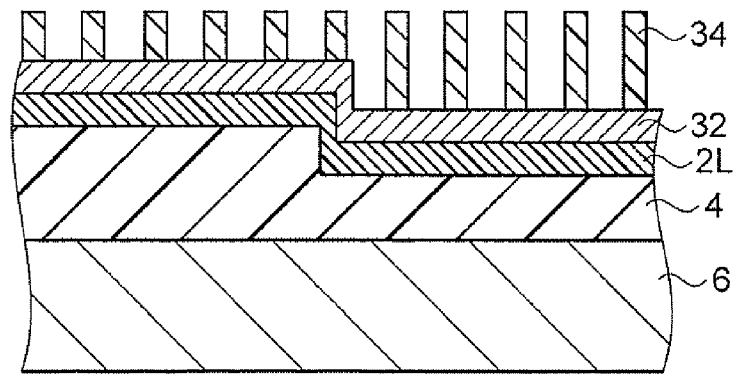

Next, in step S6, the resist 34 subjected to laser interference exposure is developed. Thus, a pattern of the resists 34 having a pitch of 140 nm and taking the shape of minute lines is obtained (FIG. 8B).

Figure 8C:
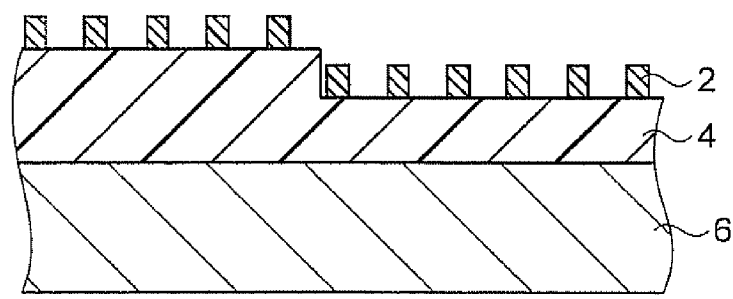

Next, in step S7, the aluminum film 2L is etched. More specifically, dry etching is performed using the pattern of the resists 34 as a mask so that the antireflection film 32 and aluminum film 2L are patterned. In subsequent step S8, the resist 34 and antireflection film 32 are eliminated. Thus, the grid 2 including wires arranged at a pitch of 140 nm is formed on the diffraction function layer 4 (FIG. 8C).

If $SiO_2$ (with a thickness of 30 nm) is previously formed between the aluminum film 2L and antireflection film 32, the etching ration with respect to the aluminum film 2L is improved compared with that with respect to the resist 34. Thus, the height of the pattern of the resists 34 is reduced. As a result, the pattern of the resists 34 is formed in a more stable manner.

Next, in step S9, the sealing layer 3 is formed on the grid 2. This step is performed, for example, by forming a layer made of $SiO_2$, SiN, or the like on the grid 2 under a vacuum environment by chemical vapor deposition (CVD), vacuum deposition, or the like. As a result, the space enclosed by the diffraction function layer 4, grid 2, and sealing layer 3 is sealed in a vacuum state (FIG. 2B).

By performing the above-described steps, the optical element 1 having the diffraction function layer 4 and grid 2 is manufactured. According to this manufacturing method, the grid 2 is more reliably formed on the surface of the diffraction function layer 4, since the bumps and dips on the surface of the diffraction function layer 4 are rectangular. While the aluminum film 2L is used as the conductor film in this embodiment, other metal materials such as silver and nickel may be used. While polymers are used as the material of the diffraction function layer 4, for example, the grid 2 may be formed on the diffraction function layer 4 formed on a quartz glass substrate by photolithography, using the above-described manufacturing method. In this case, photolithography is performed, for example, by performing a step of applying a resist onto the diffraction function material layer 4L, a step of exposing the resist using a photomask and then developing the resist, a step of etching the diffraction function material layer 4L using the remaining resist as a mask, and a step of eliminating the resist.

C. Liquid Crystal Device

Figure 10A:
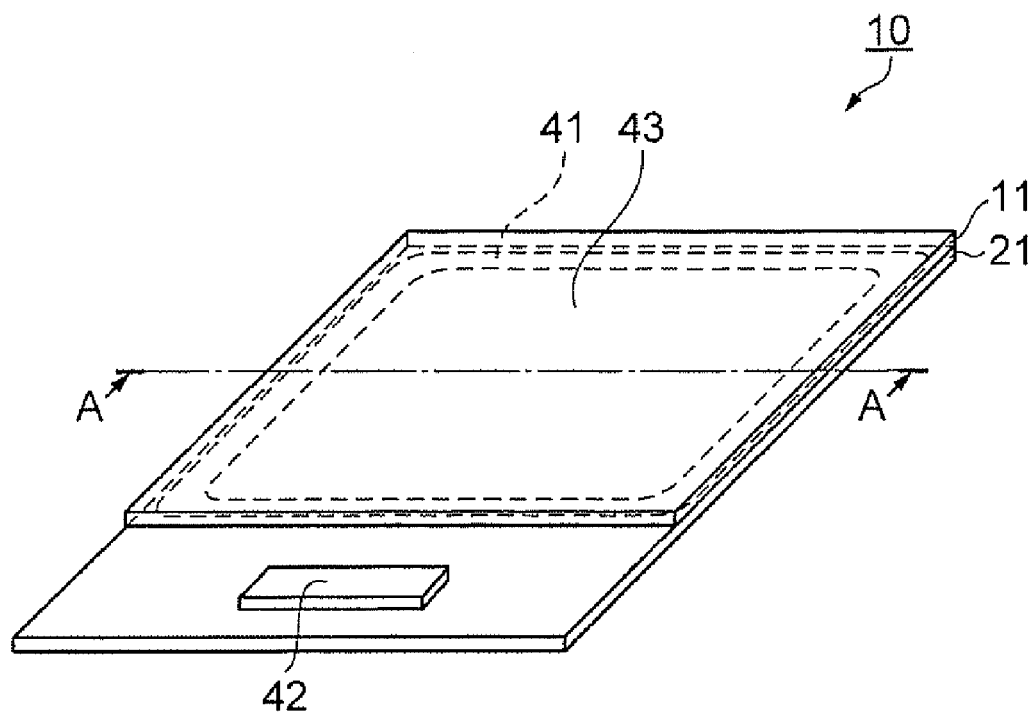
FIGS. 10A and 10B show a semi-transmission/semi-reflection liquid crystal device.
Figure 10B:
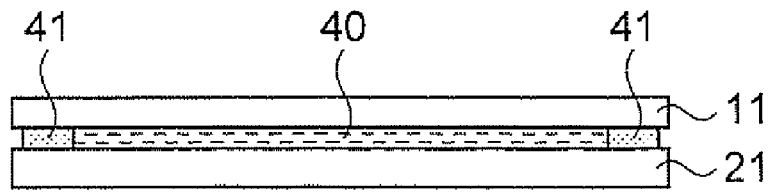

Now, a case where the above-described optical element 1 is applied to a liquid crystal device will be described. FIGS. 10A and 10B show a semi-transmission/semi-reflection liquid crystal device 10. FIG. 10A is a perspective view of the liquid crystal device 10 and FIG. 10B is a sectional view of the liquid crystal device 10 taken along line A-A of FIG. 10A. The liquid crystal device 10 includes an element substrate 21 and a counter substrate 11 that are bonded together with a frame-shaped sealing material 41 therebetween so as to face each other. The liquid crystal 40 is sealed in the space enclosed by the element substrate 21, counter substrate 11, and sealing agent 41. The element substrate 21 is larger than the counter substrate 11 and bonded to the counter substrate 11 in such a manner that a part of the element substrate 21 is elevated up from the counter substrate 11 in a top view. Mounted on this elevated part is a driver IC 42 for driving the liquid crystal 40. The liquid crystal device 10 makes displays in a display area 43 in which the liquid crystal is sealed.

Figure 11:
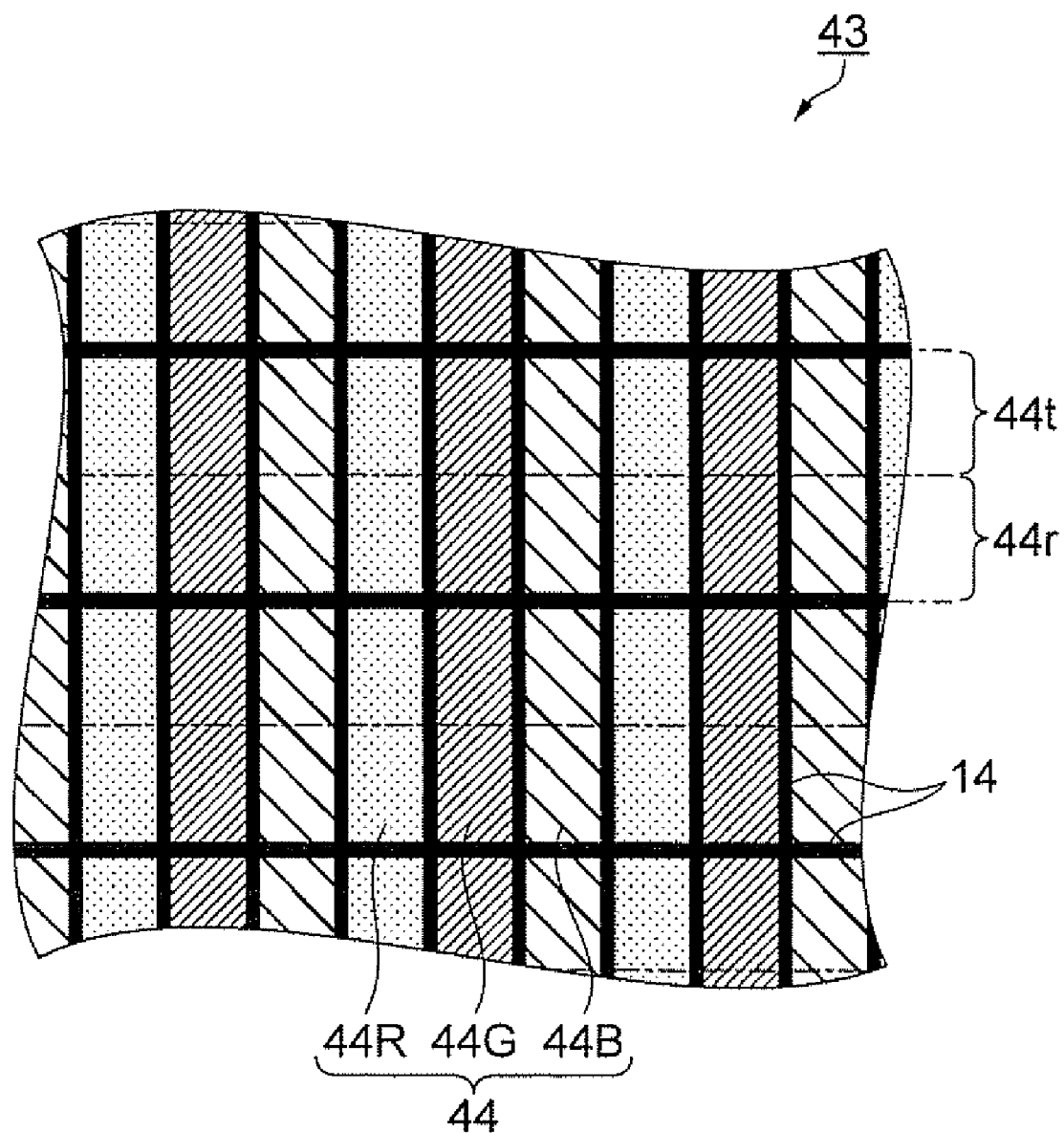
FIG. 11 is an enlarged plan view of a display area.

FIG. 11 is an enlarged plan view of the display area 43. As shown in the drawing, the liquid crystal device 10 has multiple rectangular pixels 44R, 44G, and 44B (hereafter simply referred to as "pixels 44" unless colors are distinguished) corresponding to red, green, and blue. The pixels 44 are disposed in a matrix and the pixels 44 disposed in a column all have an identical color. In other words, the pixels 44 are disposed in such a manner that the colors corresponding to the pixels 44R, 44G, and 44B are arranged in stripes. A set of three pixels 44R, 44G, and 44B arranged side-by-side in a row direction constitutes a smallest unit (pixel element) for display. The liquid crystal device 10 displays various colors by adjusting the luminance balance among the pixels 44R, 44G, and 44B in each pixel element.

Each pixel 44 includes a transmission display part 44t and a reflection display part 44r. Disposed between each two adjacent pixels 44 is a light-shielding layer (black mask) 14. The light-shielding layer 14 has a function of shielding light leaked from the pixels 44 so as to improve the display contrast.

Figure 12:
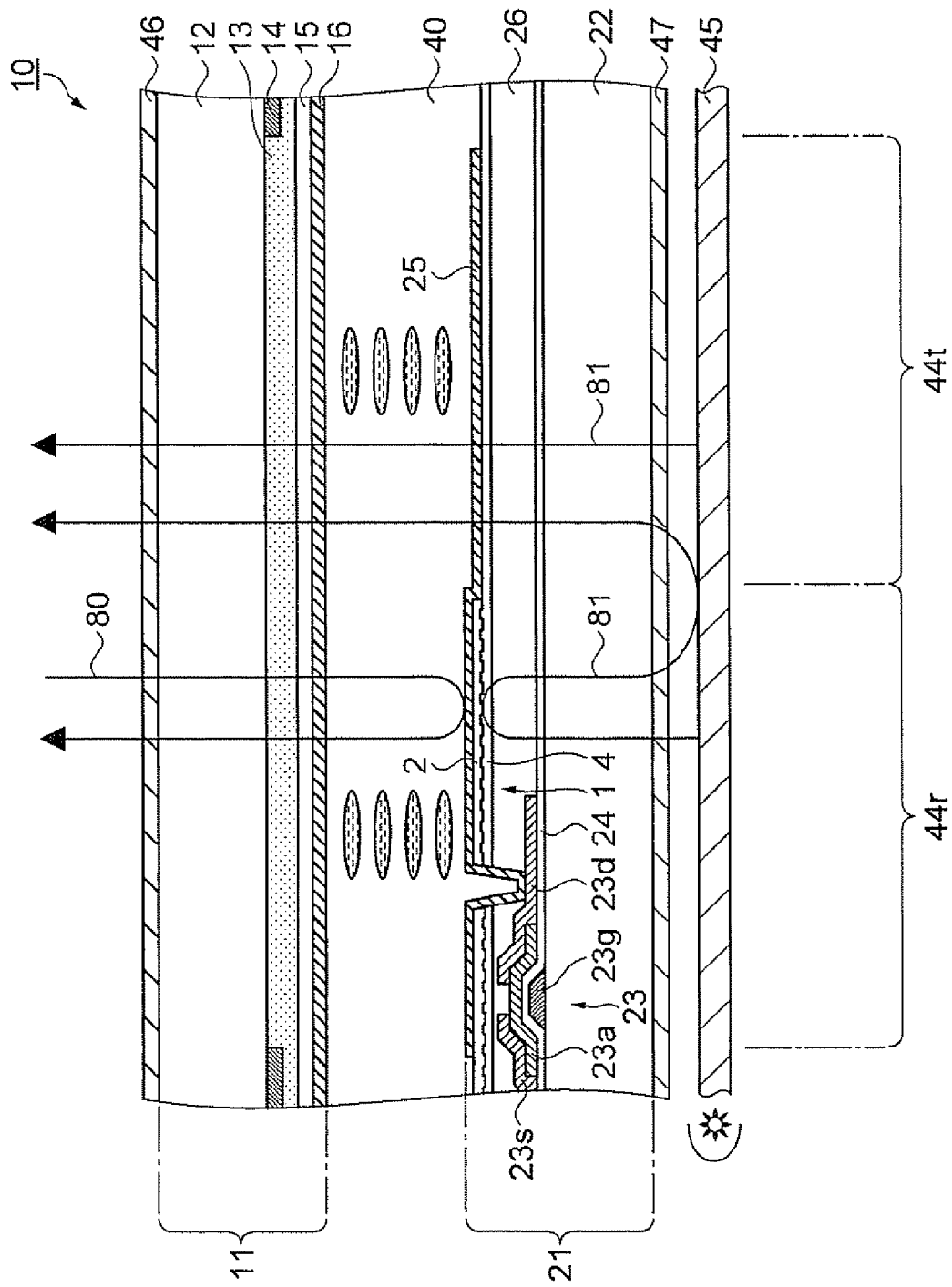
FIG. 12 is a schematic sectional view showing an aspect of the liquid crystal device in a case where a pixel is cut along a column direction.

Referring now to FIG. 12, a detailed configuration of the pixel 44 will be described. FIG. 12 is a schematic sectional view showing an aspect of the liquid crystal device 10 in a case where a pixel 44 is cut in a column direction.

The element substrate 21 includes a glass substrate 22 serving as a first substrate and as the base of the element substrate 21 and the counter substrate 11 includes a glass substrate 12 serving as a second substrate and as the base of the counter substrate 11. Formed on a surface of the glass substrate 22 facing the glass substrate 12 is a thin film transistor (TFT) element 23. More specifically, a gate electrode 23g, a gate insulating film 24, and a semiconductor layer 23a are sequentially laminated on the glass substrate 22. Also, a source electrode 23s is formed so that it overlaps the source region of the semiconductor layer 23a, and a drain electrode 23d is formed so that it overlaps the drain region of the semiconductor layer 23a. The source electrode 23s is coupled to a data line (not shown). The semiconductor layer 23a, source electrode 23s, drain electrode 23d, gate electrode 23g, and the like constitute the TFT element 23.

Formed on the TFT element 23 is an inter-layer insulating film 26 made of $SiO_2$, SiN, or the like. The inter-layer insulating film 26 may be multilayered as necessary. Laminated on the inter-layer insulating film 26 is the diffraction function layer 4 made of polymers. The diffraction function layer 4 has bumps and dips only on a surface thereof in the reflection display part 44r. Formed on the bumps and dips is the grid 2 made of aluminum wires. In other words, the optical element 1 including the diffraction function layer 4 and grid 2 is formed only in the reflection display part 44r on the inter-layer insulating film 26.

Formed on the optical element 1 in the reflection display part 44r as well as on the diffraction function layer 4 in the transmission display part 44t is a pixel electrode 25 made of translucent ITO. The pixel electrode 25 is electrically coupled to the drain electrode 23d of the TFT element 23 via a contact hole made by penetrating the grid 2, diffraction function layer 4, and inter-layer insulating film 26. The refraction index of ITO is in the vicinity of 2; therefore, according to the above-described formula $g=\lambda/(4n \cdot \cos\theta)$, the height g of the steps 8 of the diffraction function layer 4 is made smaller than that in a case where the surrounding medium is air. Formed on the pixel electrode 25 is an alignment film (not shown). The components from the glass substrate 22 to the alignment film constitute the element substrate 21.

On the other hand, a color filter 13 is formed on a surface facing the element substrate 21 of the glass substrate 12 serving as the base of the counter substrate 11. The color filter 13 absorbs a light beam with a specific wavelength among incident light beams so as to make the transmitted light into light of a predetermined color (for example, red, green, or blue). Formed between this pixel 44 and an adjacent pixel 44 is a light-shielding layer 14 made of black resin having a light-shielding effect. Formed on the color filter 13 is an overcoat 15 made of a translucent resin.

Formed on the overcoat 15 is a common electrode 16 made of ITO. Formed on the common electrode 16 is an alignment film (not shown). The components from the glass substrate 12 to the alignment film constitute the counter substrate 11.

Figure 13:
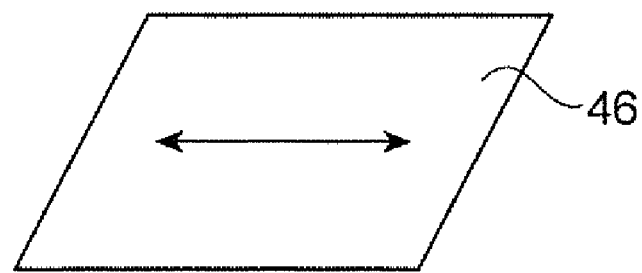
FIG. 13 is a drawing showing the directions of the optical axes of polarizing plates and the optical element.
Figure 13:
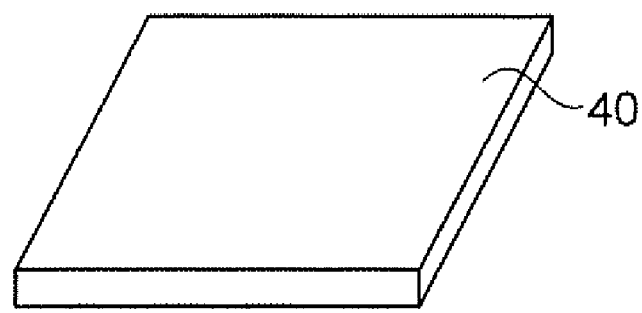
Figure 13:
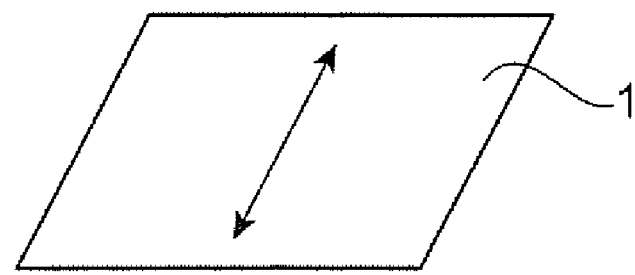
Figure 13:
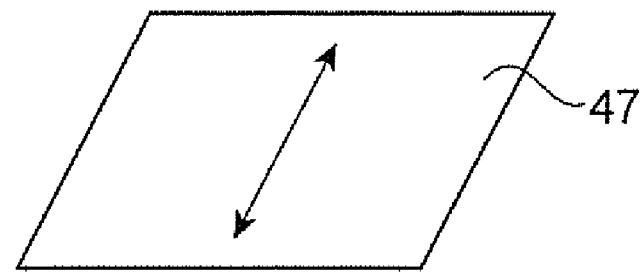
Figure 14:
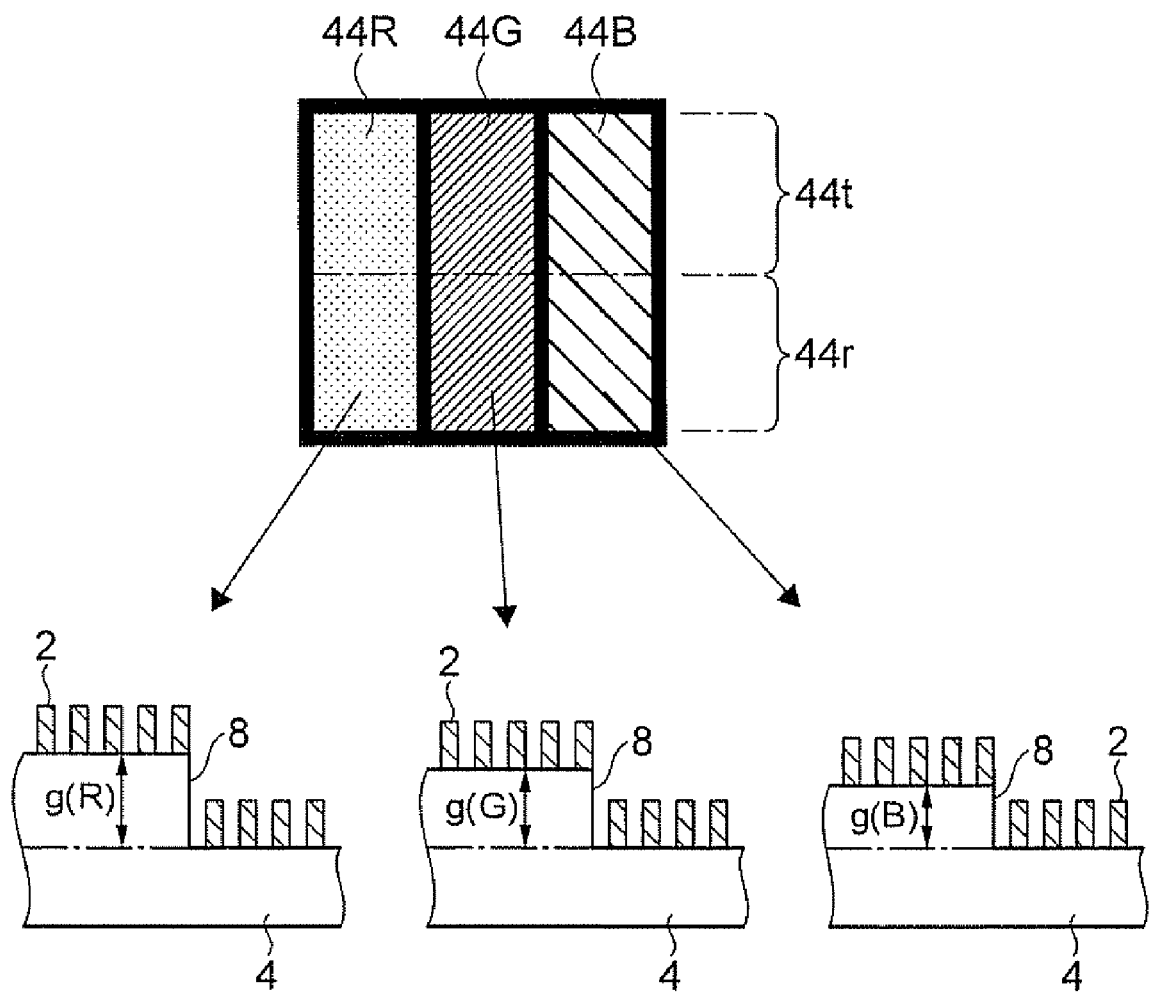
FIG. 14 is a sectional view showing the optical element in which the depth of bumps and dips on the diffraction function layer is changed according to display colors.

The twisted nematic (TN) mode liquid crystal 40 is disposed between the element substrate 21 and counter substrate 11. The liquid crystal 40 changes its alignment direction according to the magnitude of a drive voltage applied between the pixel electrode 25 and common electrode 16. Further, the liquid crystal 40 changes the polarization state of transmitted light according to the alignment direction. Also, the polarizing plates 47 and 46 are mounted on the outside surfaces of the element substrate 21 and counter substrate 11, respectively. FIG. 13 is a drawing showing the directions of the optical axes of the polarizing plates 47 and 46 and optical element 1. In FIG. 13, arrows provided on the polarizing plates 47 and 46 show transmission axes and an arrow provided on the optical element 1 shows the extending direction of the wires of the grid 2. As seen in the drawing, the polarizing plates 47 and 46 are disposed in such a manner that the transmission axes thereof are perpendicular to each other. The polarizing plate 47 is disposed in such a manner that the transmission axis thereof is in parallel with the extending direction of the wires of the optical element 1. Disposed in a position facing the polarizing plate 47 is a backlight 45 serving as a lighting system. The liquid crystal device 10 is a device for making displays using the polarization/selection function of the polarizing plates 47 and 46 and the polarization/conversion function of the liquid crystal 40.

Referring back to FIGS. 12 and 13, the display principles of the liquid crystal 10 will be described. First, when reflection display is made, outside light (incident light 80) incident from the counter substrate 11 to the reflection display part 44r is transmitted by the color filter 13, the liquid crystal 40, and the like, and then enters the optical element 1. In this case, if the liquid crystal 40 is OFF, linearly polarized light transmitted by the polarizing plate 46 is converted into perpendicular linearly polarized light due to the optical activity of the liquid crystal 40. Since the converted linearly polarized light is in parallel with the extending direction of the wires, it is reflected by the optical element 1 and then again converted into the previous linearly polarized light by the liquid crystal 40 and then transmitted by the polarized plate 46. That is, if the liquid crystal 40 is OFF, bright display is made. In this case, the reflected light is scattered by the diffraction function of the diffraction function layer 4; therefore, high-quality reflection display is made at a wide viewing angle. On the other hand, if the liquid crystal 40 is ON, the linearly polarized light transmitted by the polarizing plate 46 is transmitted by the liquid crystal 40 without being subjected to polarization/conversion by the liquid crystal 40, and then enters the optical element 1. Since the linearly polarized light is perpendicular to the extending direction of the wires, it is transmitted by the optical element 1 and then absorbed by the polarizing plate 47. That is, if the liquid crystal 40 is ON, light is not reflected toward an observer and therefore dark display is made.

Next, when transmission display is made, incident light 81 that has entered from the backlight 45 to the transmission display part 44t is transmitted by the element substrate 21 and then enters the liquid crystal 40. Note that the grid 2 is not formed in the transmission display part 44t. That is, the optical element 1 shown in FIG. 12 does not exit in the transmission display part 44t. In this case, if the liquid crystal 40 is OFF, the linearly polarized light transmitted by the polarizing plate 47 is converted into perpendicular linearly polarized light due to the optical activity of the liquid crystal 40 and then transmitted by the polarized plate 46. Thus, the linearly polarized light is visually recognized by an observer. That is, if the liquid crystal 40 is OFF, bright display is made. On the other hand, if the liquid crystal 40 is ON, the linearly polarized light transmitted by the polarizing plate 47 is absorbed by the polarizing plate 46 without being subjected to polarization/conversion by the liquid crystal 40. That is, if the liquid crystal 40 is ON, light is not transmitted toward an observer and therefore dark display is made.

Incidentally, the incident light 81 from the backlight 45 enters not only the transmission display part 44t but also the reflection display part 44r. Among components of the incident light 81, components having a polarization axis parallel to the wires are reflected and diffused by the optical element 1. These components are reflected upward by a reflection plate included in the backlight 45 and then enter the element substrate 21 again. In this case, a part of these components enters the transmission display part 44r due to the diffusion thereof by the optical element 1 and serves to make transmission display. As is understood from the above-description, since the optical element 1 is disposed in the reflection display part 44r, the use efficiency of the backlight 45 is improved. This allows saving of the light quantity of the backlight 45, thereby allowing a reduction in power consumption.

If the optical element 1 is applied to the liquid crystal device 10 capable to color display, the depth of the bumps and dips on the diffraction function layer 4 may be changed according to the display colors of the pixels 44R, 44G, and 44B. The depth of the bumps and dips on the diffraction function layer 4, that is, the height g of the steps 8 preferably satisfies a formula $g=\lambda/(4n\cdot\cos\theta)$. Here, the θ represents an angle between by an observer's line of vision and a normal to the display surface of the liquid crystal device 10. For example, if the θ is set at and around 25 degrees, a display is visually recognized with ease. If the wavelength λ is set to the center wavelengths of red, green, and blue, for example, 650 nm, 550 nm, and 450 nm, respectively, the preferable values of the height g are obtained as follows: for the pixel 44R, g(R)=179 nm; for the pixel 44G, g(G)=152 nm; and for the pixel 44B, g(B)=124 nm. The optical element 1 having such a configuration has the diffraction function layer 4 suitable for the wavelength of incident light in each pixel 44; therefore, the light is more efficiently diffused.

The liquid crystal device 10 having the above-described configuration has the optical element 1 on the inner surface of the element substrate; therefore, the liquid crystal 10 is slimmed down. Also, high-quality displays are made without causing such as a parallax due to the thickness of the substrate. Also, the depth of the bumps and dips on the diffraction function layer 4 included in the optical element 1, that is, the height g of the steps 8 is extremely small, for example, on the order of 100 to 200 nm and the surfaces (that is, first areas 4a and second areas 4b) of the bumps and dips are in parallel with the glass substrate 22. Therefore, the influence that the bumps and dips have on the alignment state of the liquid crystal 40 is suppressed. Thus, the display quality is further enhanced.

D. Liquid Crystal Device Manufacturing Method

Figure 15:
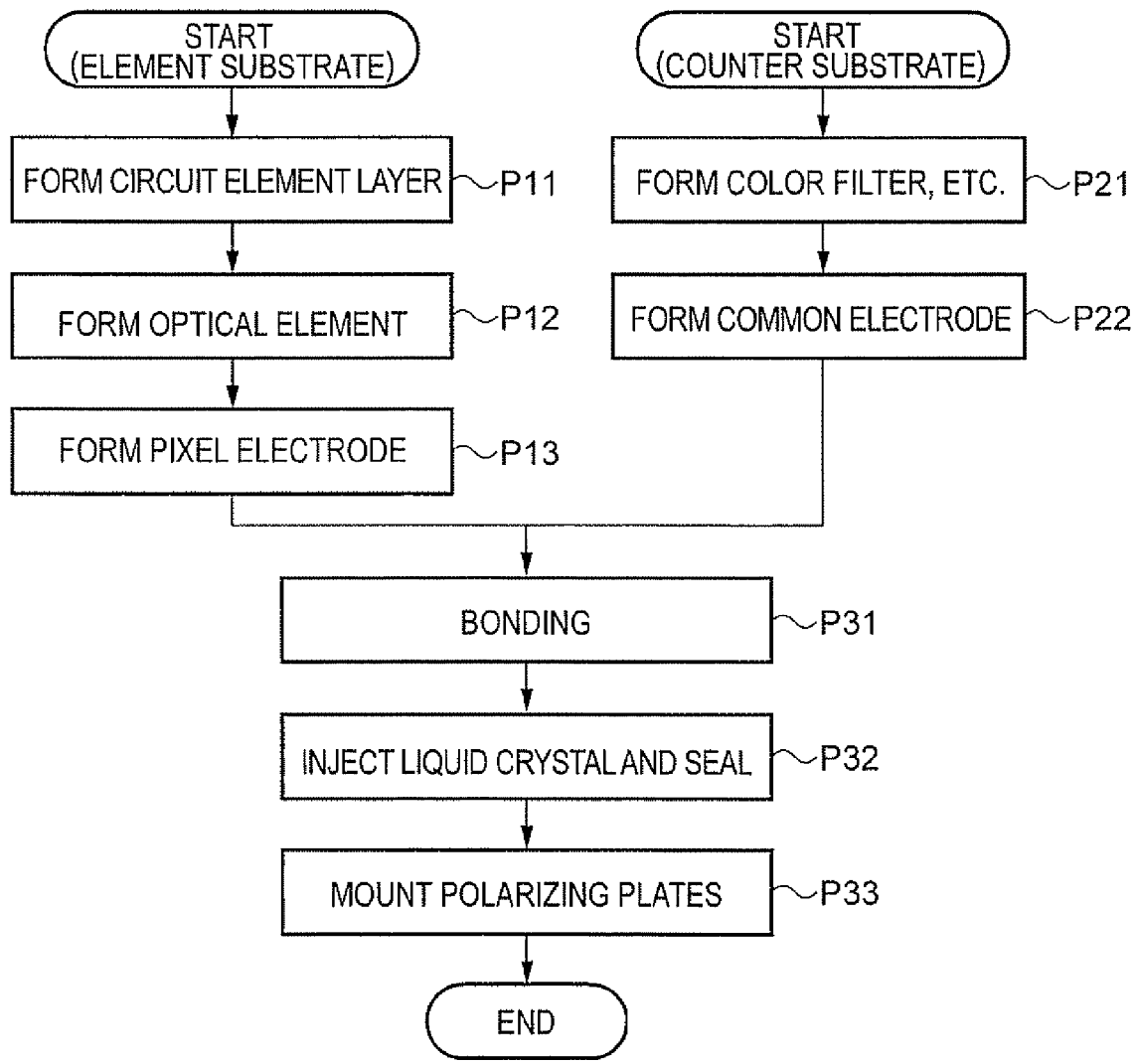
FIG. 15 is a flowchart showing the method for manufacturing the liquid crystal device.
Figure 16:
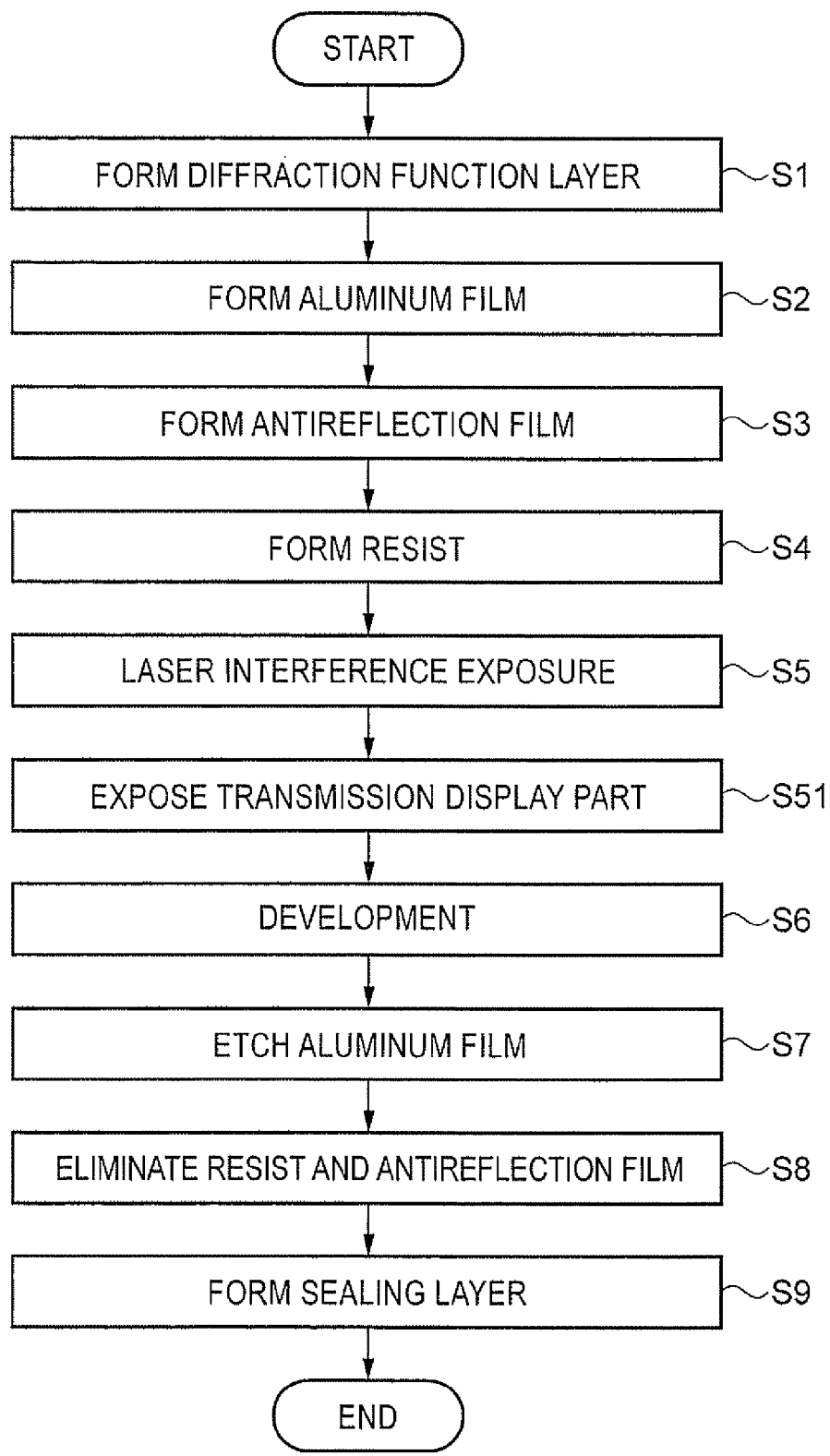
FIG. 16 is a flowchart showing details of the manufacturing process of the optical element.

Referring now to FIGS. 15 to 17, a method for manufacturing the liquid crystal device 10 will be described. FIG. 15 is a flowchart showing the method for manufacturing the liquid crystal device 10. FIG. 16 is a flowchart showing details of the manufacturing process of the optical element 1 among the components of the liquid crystal device 10. FIGS. 17A to 17D are sectional views in the manufacturing process of the optical element 1. In FIG. 15, steps P11 to P13 are steps for manufacturing the element substrate 21 and step P21 to P22 are steps for manufacturing the counter substrate 11. Steps P31 to P33 are steps for bonding the element substrate 21 and counter substrate 11 together so as to manufacture the liquid crystal device 10. Steps P11 to P13, step P21, and step P22 are performed independently.

First, in step P11, a circuit element layer including the TFT element 23, various wires, inter-layer insulating film 26, and the like is formed on the glass substrate 22. Next, in step P12, the optical element 1 is formed in the reflection display part 44r on the inter-layer insulating film 26. Step P12 includes steps S1 to S9 shown in FIG. 16. Hereafter, step P12 will be described in detail with reference to FIG. 16.

Figure 17A:
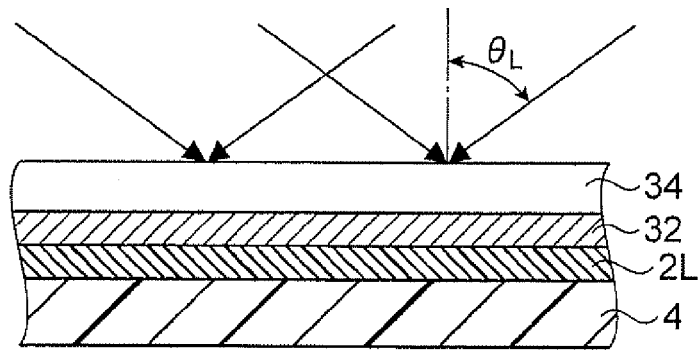
FIGS. 17A to 17D are sectional views in the manufacturing process of the optical element.

Steps S1 to S5 are similar to the method for manufacturing the optical element 1 described with reference to FIG. 6. That is, the diffraction function layer 4 is formed in step S1 and then the aluminum film 2L, antireflection film 32, and resist 34 are sequentially formed in steps S3 and S4. Thereafter, laser interference exposure is performed in step S5 so that latent images of a pattern of wires are formed (FIG. 17A).

Figure 17B:
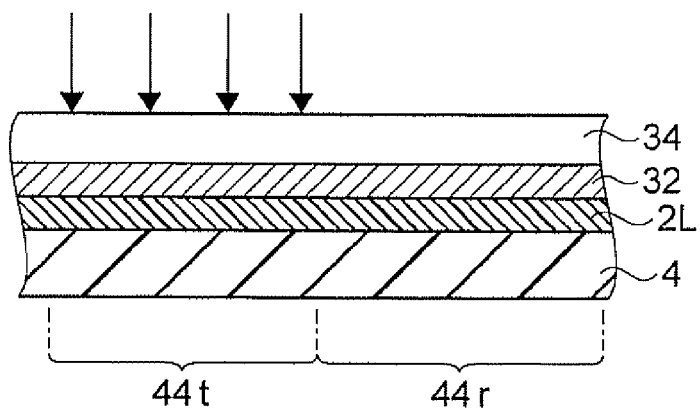

Next, in step S51, only the resist 34 disposed in the transmission display part 44t is selectively exposed (FIG. 17B). For example, exposure is performed with only the reflection display part 44r hidden behind a mask. If exposure is performed using a mask, image projection exposure is preferably performed. This is because if proximity exposure is performed, an area where no pattern is formed may occur due to the diffraction of light at the edge of the opening of the mask.

Figure 17C:
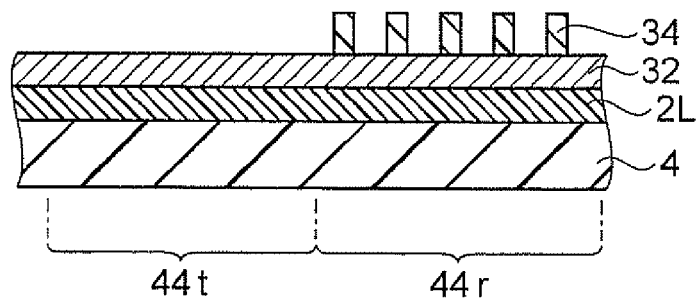

Next, in step S6, the resist 34 is developed. At that time, the resist 34 disposed in the transmission display part 44t is completely eliminated, while a pattern of the resists 34 taking the shape of minute lines with a pitch of 140 nm is left in the reflection display part 44r (FIG. 17C).

Figure 17D:
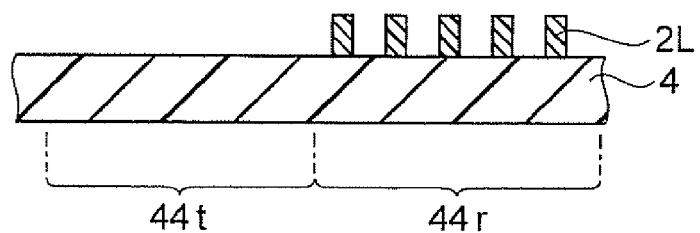

Next, in step S7, the aluminum film 2L is etched. More specifically, dry etching is performed with the pattern of the resist 34 used as a mask so that the antireflection film 32 and aluminum film 2L are patterned. In subsequent step S8, the resist 34 and antireflection film 32 are eliminated. By performing these steps, the grid 2 including the wires arranged at a pitch of 140 nm is formed only in the reflection display part 44r on the diffraction function layer 4 (FIG. 17D).

Next, in step S9, the sealing layer 3 is formed on the grid 2 thereby completing the manufacturing process (step P12) of the optical element 1. Note that the orders of steps S5 and S51 described above may be reversed. That is, the transmission display unit 44t as a whole may be first exposed and then laser interference exposure may be performed so that latent images of wires are formed.

Referring back to FIG. 15, in step P13, the pixel electrode 25 is formed on the optical element 1 in the reflection display part 44r and on the diffraction function layer 4 in the transmission display part 44t. While coating of the alignment film and rubbing is performed subsequently to step P13, these processes are not shown in the flowchart. After performing steps P11 and P13, the element substrate 21 is completed.

On the other hand, in step P21, the color filter 13, light-shielding layer 14, and overcoat 15 are formed on the glass substrate 12. This step is performed by spin-coating, photolithography, or the like.

Next, in step S22, the common electrode 16 is formed on the overcoat 15. While coating of the alignment film and rubbing is performed subsequently to step P22, these processes are not shown in the flowchart. After performing steps P21 and P22, the counter substrate 11 is completed.

In step P31, the element substrate 21 and counter substrate 11 are bonded together. The bonding is performed by applying the sealing agent 41 (FIG. 10) onto the element substrate 21 or counter substrate 11, aligning these substrates, and then bringing these substrates into contact with each other and attaching them to each other while applying pressure.

In step P32, the liquid crystal 40 is injected between the element substrate 21 and counter substrate 11 from the opening (inlet) of the sealing agent 41 and then the inlet is sealed.

In step P33, the polarizing plates 47 and 46 are mounted on the outside surfaces of the element substrate 21 and counter substrate 11, respectively. Then, the backlight 45 is mounted on the liquid crystal device 10 as appropriate. Thus, the liquid crystal device 10 is completed.

While a manufacturing method in which the substrates are bonded together and then the liquid crystal 40 is injected has been described above, instead, the liquid crystal device 10 may be manufactured by first dropping the liquid crystal 40 onto the element substrate 21 or counter substrate 11 and then bonding these substrates together.

E. Electronic Apparatus

Figure 20:
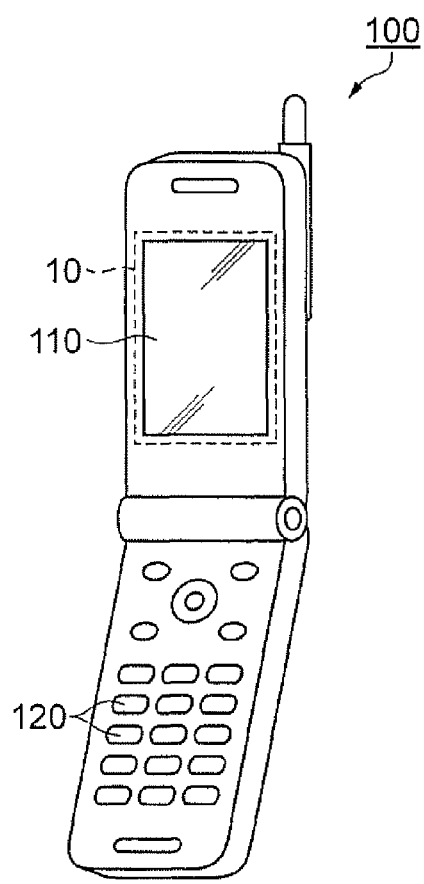
FIG. 20 is a perspective view of a cell phone as an electronic apparatus.
Figure 21:
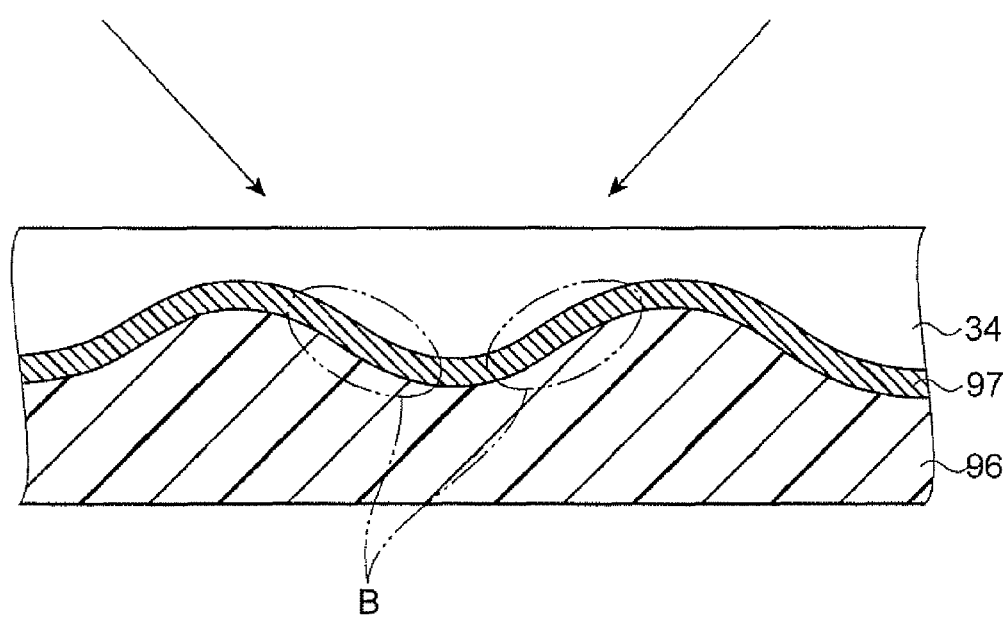
FIG. 21 is a sectional view showing the manufacturing process of a related-art optical element.

The above-described liquid crystal device 10 may be mounted on an electronic apparatus such as a cell phone 100 shown in FIG. 20 and used. The cell phone 100 includes a display unit 110 and operation buttons 120. The display unit 110 displays various types of information, including information inputted using the operation buttons 120 and incoming call information, with high-quality using the built-in liquid crystal device 10.

The liquid crystal device 10 is applicable not only to the above-described cell phone 100 but also to various types of electronic apparatuses such as mobile computers, digital cameras, digital video cameras, vehicle-mounted apparatuses, and audio systems.

Modification 1

Figure 18A:
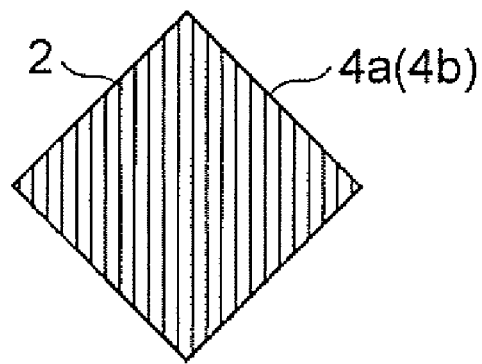
FIGS. 18A to 18C are drawings showing examples of the relation between the shape of the smallest unit of first areas and second areas on the diffraction function layer and the extending direction of wires included in a grid.
Figure 18B:
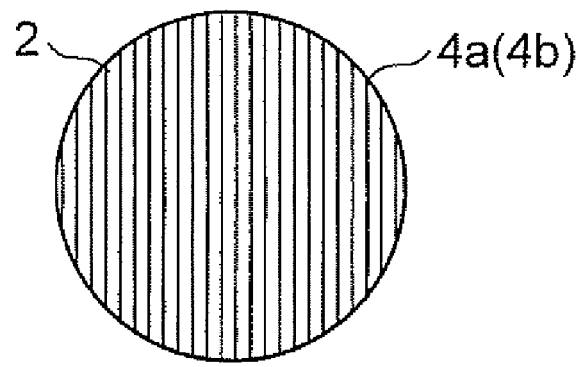
Figure 18C:
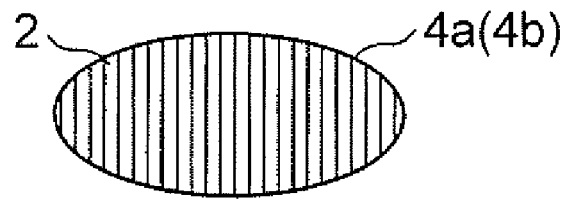
Figure 19:
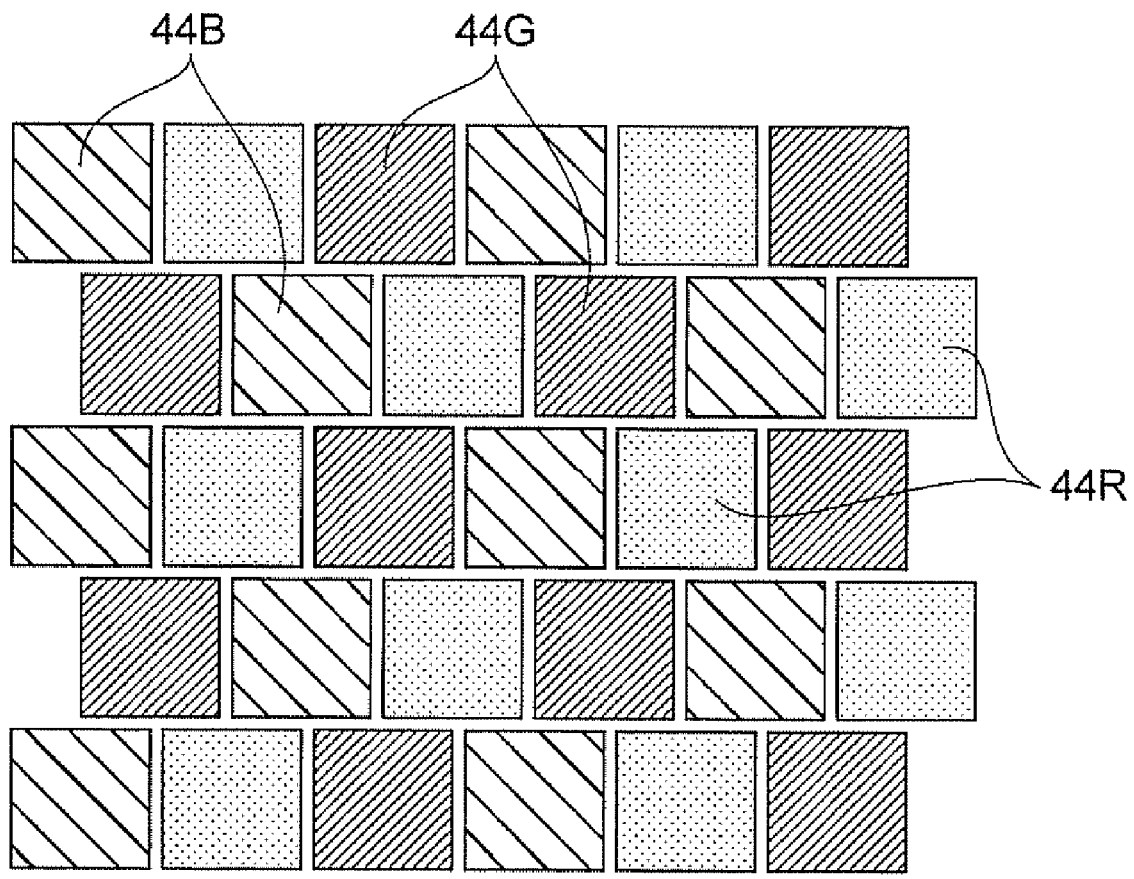
FIG. 19 is a drawing showing the disposition of pixels of a liquid crystal device according to a modification.

It is assumed in the above-described embodiment that the first areas 4a and second areas 4b on the diffraction function layer 4 are each a square or combinations of the square and that the wires included in the grid 2 are in parallel with one of the sides of the squares. However, the first areas 4a and second areas 4b may have other configurations. FIGS. 18A to 18C are drawings showing examples of the relation between the shape (hereafter referred to as a "unit shape") of the smallest unit of the first areas 4a and second areas 4b of the diffraction function layer 4 and the extending direction of the wires included in the grid 2.

In a configuration shown in FIG. 18A, the unit shape is a square, and the angle formed by each side of the square and the extending direction of the wires of the grid 2 is 45 degrees. According to such a configuration, the linear boundaries between the unit shapes are nonparallel to the wires. This prevents the wires from being formed along the steps 8 of the diffraction function layer 4. As a result, the wires disposed in the proximity of the steps 8 are prevented from becoming unstable.

In FIGS. 18B and 18C, the unit shapes are circles and ellipses, respectively. According to such a configuration, the wires of the grid 2 are disposed at a given angle with respect to the boundaries between the unit shapes; therefore, the wires are stably formed like in FIG. 18A.

Circular unit shapes allow the reflected light strength distribution to be isotropic, while anisotropic unit shapes, for example, rectangular or oval unit shapes allow the reflected light strength distribution to be anisotropic. In this case, the width of the distribution is expanded in the direction in which the width of each unit shape is reduced, while the width of the distribution is reduced in the direction in which the width of each unit shape is expanded.

Modification 2

The liquid crystal device 10 according to the above-described embodiment is a semi-transmission/semi-reflection liquid crystal device in which a part of each pixel 44 includes the optical element 1. However, without being limited to this configuration, the liquid crystal device 10 may be a reflection liquid crystal device in which the optical element 1 is disposed across each pixel 44.

Modification 3

In the above-described embodiment, the pixels 44R, 44G, and 44G are arranged in stripes in the liquid crystal device 10. However, instead, these pixels may be arranged in deltas. In this arrangement, even if any three pixels 44 that are adjacent to each other in a delta are selected, one each of the pixels 44R, 44G, and 44G is always included in the three pixels. The liquid crystal device 10 having such a configuration also makes high-quality displays using the optical element 1.

Modification 4

In the above-described embodiment, a case where the optical element 1 is applied to the liquid crystal device 10 is shown. However, the liquid crystal device 10 is one of many application examples of the optical element 1. In addition to the liquid crystal device 10, the optical element 1 is also applicable, for example, to a liquid crystal projector requiring a polarization element having excellent light stability.

Modification 5

The liquid crystal device 10 according to the above-described embodiment is a normally white mode liquid crystal device that makes bright display when the liquid crystal 40 is OFF. However, by changing the optical axes of the polarizing plates 46 and 47 and optical element 1 as appropriate, the liquid crystal device 10 may be made into a normally black mode liquid crystal device that makes dark display when the liquid crystal 40 is OFF.

Modification 6

As the mode of the liquid crystal 40 included in the liquid crystal device 10 according to the above-described embodiment, not only TN mode but also various modes such as in plain switching (IPS) mode, fringe field switching (FFS) mode, vertical alignment (VA) mode, and super twisted nematic (STN) mode may be used. In order to utilize the reflection characteristics of the optical element 1, IPS, FFS, and VA, in which a wide viewing angle is obtained, among these modes are preferably used, By using, as the mode of the liquid crystal 40, a mode in which a wide viewing angle is obtained, an image recognized at a viewing angle inclined from the front is displayed with high luminance and high quality.

What is claimed is:

1. A liquid crystal device comprising:
an optical element, the optical element including:
    a diffraction function layer for diffracting at least a part of incident light; and
    a grid disposed on a first surface of the diffraction function layer, the grid including a plurality of wires, wherein
    the diffraction function layer includes a flat portion and a non-flat portion adjacent to the flat portion,
    the first surface in the flat portion is flat and is not provided with the grid,
    the first surface in the non-flat portion includes a plurality of first areas and a plurality of second areas, and
    the first areas and the second areas are provided with the grid and are different from each other in a height from a second surface of the diffraction function layer as a surface opposite to the first surface, and steps are provided on boundaries between the first areas and the second areas;

a transmission display part, the flat portion of the diffraction function layer being formed in the transmission display part; and a reflection display part, the non-flat portion of the diffraction function layer being formed in the reflection display part.

2. The liquid crystal device according to claim 1, wherein the first areas and the second areas are in parallel with each other vertically.

3. The liquid crystal device according to claim 1, wherein the first areas are disposed on the first surface of the non-flat portion irregularly.

4. The liquid crystal device according to claim 1, wherein the first surface of the non-flat portion includes a plurality of unit patterns, in each of which the first areas are disposed so that the first areas are irregularly distributed.

5. The liquid crystal device according to claim 4, wherein directions of adjacent unit patterns among the unit patterns are different from each other.

6. The liquid crystal device according to claim 1, wherein peripheries of the first areas and second areas each include a straight line, and the wires are disposed at a given angle with respect to the straight line.

7. The liquid crystal device according to claim 1, wherein if a wavelength of incident light is represented by $\lambda$, an incident angle is represented by $\theta$, and a refraction index of a surrounding medium of the optical element is represented by n, a height of the steps is approximately equal to $\lambda/(4n\cdot\cos\theta)$.

8. The liquid crystal device according to claim 1, wherein the diffraction function layer is made of a material different from a material of the grid and is translucent.

9. The liquid crystal device according to claim 8, further comprising an adhesion layer disposed between the diffraction function layer and the grid, the adhesion layer being made of a material different from the respective materials of the diffraction function layer and the grid, wherein an adhesion strength between the diffraction function layer and the adhesion layer and an adhesion strength between the grid and the adhesion layer are each higher than an adhesion strength between the diffraction function layer and the grid without the adhesion layer.

10. The liquid crystal device according to claim 1, further comprising:

first and second substrates disposed so as to face each other;

liquid crystal disposed between the first and second substrates; and a plurality of pixels each including the optical element wherein the optical element is disposed between the first substrate and the liquid crystal so as to include both the flat portion and the non-flat portion of the optical element within one pixel of the plurality of pixels.

11. A liquid crystal device comprising:

an optical element, the optical element including:

a diffraction function layer for diffracting at least a part of incident light; and a grid disposed on a first surface of the diffraction function layer, the grid including a plurality of wires, wherein the diffraction function layer includes a flat portion and a non-flat portion adjacent to the flat portion, in the flat portion, the first surface is flat and is not provided with the grid, in the non-flat portion, the first surface is provided with the grid, the first surface in the non-flat portion includes a plurality of areas different from each other in a height from a second surface of the diffraction function layer as a surface opposite to the first surface, and steps are provided on boundaries between the plurality of areas;

a transmission display part, the flat portion of the diffraction function layer being formed in the transmission display part; and a reflection display part, the non-flat portion of the diffraction function layer being formed in the reflection display part.

12. The liquid crystal device according to claim 11, wherein if a wavelength of incident light is represented by $\lambda$, an incident angle is represented by $\theta$, and a refraction index of a surrounding medium of the optical element is represented by n, a height of the steps is approximately equal to $(2m+1)\lambda/(4n\cdot\cos\theta)$ where m=0, 1, 2, 3 . . . .

13. The liquid crystal device according to claim 11, further comprising:

first and second substrates disposed so as to face each other;

liquid crystal disposed between the first and second substrates; and a plurality of pixels each including the optical element, wherein the optical element is disposed between the first substrate and the liquid crystal so as to include both the flat portion and the non-flat portion of the optical element within one pixel of the plurality of pixels, and the plurality of areas of the optical element include an area whose display color is red, an area whose display color is green, and an area whose display color is blue, and the red area, green area, and blue area have the different height.

14. The liquid crystal device according to claim 10, further comprising a lighting system disposed on a side of the first substrate opposite to the second substrate, the lighting system applying light onto the first substrate.

15. An electronic apparatus, wherein a display includes the liquid crystal device according to claim 10.

16. A method for manufacturing a liquid crystal device that includes an optical element, a transmission display part and a reflection display part, comprising:

forming the optical element, wherein the step of forming the optical element comprises:

forming a diffraction function layer, the diffraction function layer includes a flat portion that is formed in the transmission display part and a non-flat portion that is formed in the reflection display part and is adjacent to the flat portion, forming a conductive film; and forming a grid in the non-flat portion of the diffraction function layer, wherein in the step of forming the diffraction function layer, in one area, by processing a part of a first surface of a diffraction function material layer, a plurality of first areas and a plurality of second areas are provided with the grid and are different from the first areas in a height from a second surface of the diffraction function material layer are formed on the first surface and steps are formed on boundaries between the first areas and second areas, the first surface in the flat portion is flat and is not provided with the grid; and in another area, one surface of a diffractive functional material layer is formed such that the height from another surface is made to be a given height, in the step of forming a conductive film, a conductive film is formed on the diffraction function film; and in the step of forming a grid, by processing a part of the conductive film, a grid including a plurality of wires is formed.

17. The method for manufacturing the liquid crystal device according to claim 16, wherein the step of forming a grid includes:

laminating an antireflection film and a resist sequentially on the conductive film;

removing the resist from the other area;

subjecting the resist to laser interference exposure and then developing the resist;

processing the conductive film using the developed resist as a mask; and removing the resist and the antireflection film.

18. The method for manufacturing the liquid crystal device according to claim 16, wherein the liquid crystal device includes a plurality of pixels each including the optical element comprising:

forming a diffraction function material layer on a first substrate;

forming an optical element in at least a part of each of the pixels; and bonding a second substrate to the first substrate in such a manner that the second substrate is opposed to a surface of the first substrate on which the optical element is formed.

19. The method for manufacturing the liquid crystal device according to claim 18, wherein the step of forming the optical element forms the optical element such that the other area corresponds to the transmission display part of each of the pixels.

* * * * *